United States Patent
Narukawa

(10) Patent No.: US 10,661,439 B2
(45) Date of Patent: May 26, 2020

(54) ABNORMAL CONTACT DETECTING METHOD AND CONTACT SITE IDENTIFYING METHOD FOR MOBILE ROBOT

(71) Applicant: HONDA MOTOR CO., LTD., Tokyo (JP)

(72) Inventor: Kaname Narukawa, Saitama (JP)

(73) Assignee: HONDA MOTOR CO., LTD., Tokyo (JP)

(*) Notice: Subject to any disclaimer, the term of this patent is extended or adjusted under 35 U.S.C. 154(b) by 360 days.

(21) Appl. No.: 15/892,491

(22) Filed: Feb. 9, 2018

(65) Prior Publication Data

US 2018/0250812 A1 Sep. 6, 2018

(30) Foreign Application Priority Data

Mar. 3, 2017 (JP) .................. 2017-040850

(51) Int. Cl.
| | | |
|---|---|---|
| B25J 9/00 | (2006.01) | |
| B25J 9/16 | (2006.01) | |
| B25J 13/08 | (2006.01) | |
| B25J 19/06 | (2006.01) | |

(52) U.S. Cl.
CPC ............. *B25J 9/163* (2013.01); *B25J 9/0087* (2013.01); *B25J 9/162* (2013.01); *B25J 9/1612* (2013.01); *B25J 9/1694* (2013.01); *B25J 13/081* (2013.01); *B25J 13/085* (2013.01); *B25J 19/063* (2013.01); *G05B 2219/40201* (2013.01); *G05B 2219/40541* (2013.01); *Y10S 901/01* (2013.01); *Y10S 901/09* (2013.01); *Y10S 901/46* (2013.01)

(58) Field of Classification Search
CPC ........ B25J 9/163; B25J 19/063; B25J 9/0087; B25J 9/1612; B25J 9/162; B25J 13/085; B25J 13/081; B25J 9/1694; G05B 2219/40201; G05B 2219/40541; Y10S 901/46; Y10S 901/01; Y10S 901/09

See application file for complete search history.

(56) References Cited

U.S. PATENT DOCUMENTS

| | | | |
|---|---|---|---|
| 8,706,299 B2 | 4/2014 | Sanders et al. | |
| 2013/0144441 A1* | 6/2013 | Kanazawa | B25J 9/1607 700/263 |
| 2013/0178983 A1* | 7/2013 | Watabe | G05D 3/12 700/258 |
| 2016/0082591 A1* | 3/2016 | Takagi | B25J 9/1674 700/256 |
| 2016/0129591 A1* | 5/2016 | Kanemoto | B25J 13/085 700/254 |

FOREIGN PATENT DOCUMENTS

| | | |
|---|---|---|
| JP | 2010-115780 | 5/2010 |
| JP | 2013-031913 | 2/2013 |

\* cited by examiner

*Primary Examiner* — Ian Jen
(74) *Attorney, Agent, or Firm* — Rankin, Hill & Clark LLP

(57) ABSTRACT

During an operation of a mobile robot 1, observed values of a plurality of reference parameters including at least one of contact reaction forces) of one or more movable links 3, 4 and a contact reaction force function value expressed as a function value of contact reaction force(s) of one or more movable links 3, 4 are acquired based on outputs from force detectors 31 mounted on the respective movable links 3, 4 of the mobile robot 1, and the observed values of the reference parameters are used to detect presence or absence of occurrence of abnormal contact of the mobile robot 1 by a contact detecting model Ai.

19 Claims, 7 Drawing Sheets

FIG.3

| Operation Pattern | Reference Parameters |||||||||||||||||||||||||
|---|---|---|---|---|---|---|---|---|---|---|---|---|---|---|---|---|---|---|---|---|---|---|---|---|---|
| | Contact Reaction Force of Left Arm Link |||||| Contact Reaction Force of Right Arm Link |||||| Contact Reaction Force of Left Leg Link |||||| Contact Reaction Force of Right Leg Link |||||| ZMP Change Rate ||
| | Mx | My | Mz | Fx | Fy | Fz | Mx | My | Mz | Fx | Fy | Fz | Mx | My | Mz | Fx | Fy | Fz | Mx | My | Mz | Fx | Fy | Fz | DZMPx | DZMPy |
| Quadrupedal movement or Bipedal movement + touching wall with hands | | | O | O | O | | | | O | O | O | | | | O | O | O | | | | O | O | O | | O | O |
| Bipedal movement (without touching with hands) | | | | | | | | | | | | | | | O | O | O | | | | O | O | O | | O | O |
| Bipedal movement + opening/closing door | | | | | | | O | O | O | O | O | O | | | O | O | O | | | | O | O | O | | O | O |
| Reaching ladder | | O | | | | O | | | | | | O | | O | | | | O | | O | | | | O | O | |
| Ascending/descending stairs with handrail | | | | | | | | | O | O | O | O | | | O | O | O | | | | O | O | O | | O | O |
| Ascending/descending ladder | O | | O | O | O | O | O | | O | O | O | O | O | | O | O | O | | O | | O | O | O | | | O |

FIG.4

| OPERATION PATTERN AT THE TIME OF DETECTION OF ABNORMAL CONTACT | STOP OPERATION PATTERN |
|---|---|
| QUADRUPEDAL MOVEMENT (TROT, HIGH SPEED) | REAL-TIME STOP OPERATION (→ LANDING FREE LEG ON THE SPOT WHEN ABNORMAL CONTACT IS DETECTED ON THE WAY) |
| QUADRUPEDAL MOVEMENT (TROT, LOW SPEED) | LANDING FREE LEG ON THE SPOT |
| QUADRUPEDAL MOVEMENT (CRAWL) | |
| BIPEDAL MOVEMENT (WITHOUT TOUCHING WITH HANDS) | REAL-TIME STOP OPERATION (→ LANDING FREE LEG ON THE SPOT WHEN ABNORMAL CONTACT IS DETECTED ON THE WAY) |
| BIPEDAL MOVEMENT + TOUCHING WALL WITH HANDS | |
| BIPEDAL MOVEMENT + OPENING/CLOSING DOOR | |
| ASCENDING/DESCENDING STAIRS WITH HANDRAIL | |
| REACHING LADDER | LOCKING JOINTS |
| ASCENDING/DESCENDING LADDER | |

LOCKING JOINTS

LANDING FREE LEG ON THE SPOT

REAL-TIME STOP OPERATION

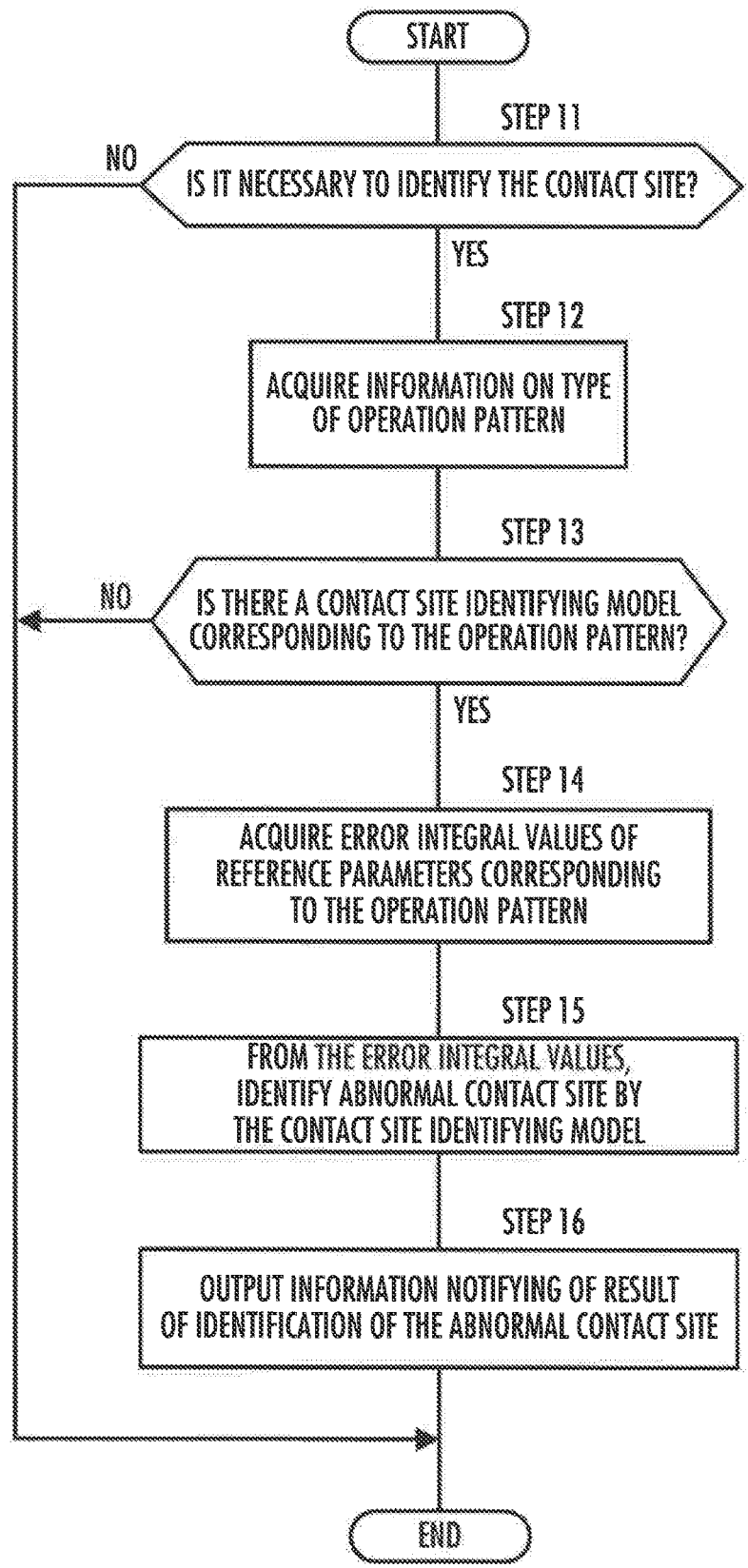

ABNORMAL CONTACT DETECTING METHOD AND CONTACT SITE IDENTIFYING METHOD FOR MOBILE ROBOT

BACKGROUND OF THE INVENTION

Field of the Invention

The present invention relates to a method of detecting presence or absence of contact of a movable device such as a mobile robot with an external object or its contact site with the external object.

Description of the Related Art

A mobile robot, such as a biped mobile robot, having a plurality of movable links extended from the body and traveling by repeatedly making the distal portions of the movable links moved in the air and then brought into contact with an external object such as a floor surface is conventionally known (see, for example, Japanese Patent Application Laid-Open No. 2010-115780).

Mobile robots of this type are capable of traveling in various kinds of environments. Thus, recently, it has been attempted to make use of the mobile robots of this type in various environments including rough or irregular grounds.

Further, a technique of controlling a robot execution sequence using state classification has been proposed in, for example, Japanese Patent Application Laid-Open No. 2013-31913 or U.S. Pat. No. 8,706,299.

SUMMARY OF THE INVENTION

During traveling of the mobile robot described above, the distal portion(s) of one or more movable links is/are moved in the air repeatedly. Thus, particularly during traveling of the mobile robot in an environment where various kinds of objects exist indiscriminately like on a rough or irregular ground, it is highly likely that the movable link of the mobile robot being moved in the air comes into contact with an external object unexpected by an operational goal of the mobile robot. Herein, such contact of a movable link of the mobile robot being moved in the air with an external object (contact unexpected by an operational goal of the mobile robots is referred to as abnormal contact.

When such abnormal contact occurs, the mobile robot may lose balance, or the actual operation of the mobile robot may diverge from the operational goal, or the mobile robot may be damaged. It is thus desirable that, when the abnormal contact occurs, the occurrence of the abnormal contact may be detected in real time so as to be able to take an appropriate measure quickly. It is further desirable that the site of the mobile robot where the abnormal contact has occurred may be identified for the purposes of maintenance of the mobile robot and the like.

In this case, it would be possible to detect the occurrence of the abnormal contact when, for example, a sheet-like pressure sensor is disposed on a surface of each movable link or a torque sensor is disposed on each joint of the respective movable links of the mobile robot and the outputs of the pressure sensors or the torque sensors are observed during the operation of the mobile robot.

With this technique, however, the configuration for detecting occurrence of abnormal contact would be expensive and would also likely hinder reduction in size or weight of the mobile robot.

The present invention has been accomplished in view of the foregoing and it is an object of the present invention to provide a method by which, in a mobile robot having a plurality of movable links extended from the body, the presence or absence of occurrence of abnormal contact can be detected in real time appropriately with an inexpensive configuration.

It is another object of the present invention to provide a method by which, upon occurrence of abnormal contact in the mobile robot, the site in which the abnormal contact has occurred can be identified appropriately with an inexpensive configuration.

An abnormal contact detecting method for a mobile robot according to the present invention is a method of detecting presence or absence of occurrence of abnormal contact in a mobile robot, the mobile robot including a body, a plurality of movable links each extended from the body so as to be movable with respect to the body, and a force detector disposed on each movable link so as to be able to detect a contact reaction force acting on the movable link in accordance with contact of a distal portion of the movable link with an external object, the mobile robot being movable with a motion including an operation in which at least one of the movable links is moved in the air and a succeeding operation in which the distal portion of the movable link is brought into contact with an external object, the method including: a first step of, during an operation of the mobile robot, acquiring, based on outputs from the force detectors, an observed value of respective ones of a plurality of contact detecting reference parameters, the contact detecting reference parameters including at least one of a contact reaction force of a respective one of one or more of the movable links and a contact reaction force function value expressed as a function value of a contact reaction force of a respective one of one or more of the movable links; and a second step of using the observed value of the respective ones of the contact detecting reference parameters to detect the presence or absence of occurrence of the abnormal contact by a contact detecting model created in advance (first aspect of the present invention).

Here, the terms used in the aspects (including the second through nineteenth aspects described below) of the present invention will be described supplementally. As used herein, "abnormal contact" means contact of a movable link in the state of being moved in the air with an external object during an operation of the mobile robot, which contact was not supposed in an operational goal of the mobile robot. Thus, the "abnormal contact" does not include contact of the movable link with an external object, expected in the operational goal of the mobile robot, at the expected arrival point following the movement of the movable link in the air.

The "contact reaction force" acting on each movable link may generally be expressed as a set of translational force vector and moment vector, Given components (in given directions) of the translational force vector and of the moment vector constituting the "contact reaction force" are parameters that may be used as the aforesaid contact detecting reference parameters (or as contact site identifying reference parameters described later)

Further, the "contact reaction force function value", in more detail, is expressed as a function value of one or more components of the translational force vector and the moment vector constituting the contact reaction force of a respective one of one or more of the movable links. For the "contact reaction force function value", for example, an actual position of the zero moment point (ZMP) of the mobile robot, or an amount of change per unit time of the ZMP, or a moment component about a horizontal axis direction acting on a desired position of the ZMP by the overall contact reaction forces acting on the mobile robot, may be adopted.

The present invention will be described below based on the premises above. According to various experiments and studies conducted by the present inventors, in the case where the aforesaid abnormal contact occurs during an operation of a mobile robot, generally, an output from a force detector of any one or more of the plurality of movable links of the mobile robot is influenced by the occurrence of the abnormal contact.

Consequently, an observed value of the contact reaction force indicated by the output from the force detector of the one or more movable links (observed value of the contact reaction force of the respective one of the one or more movable links) is influenced by the occurrence of the abnormal contact.

Thus, when a plurality of reference parameters for use in detecting contact are selected appropriately from the contact reaction forces of all the movable links and the aforesaid contact reaction force function value, then the presence or absence of occurrence of abnormal contact can be detected appropriately in real time with the second step described above.

In this case, the observed value of the respective contact detecting reference parameters required in the second step is a value (detection value or estimate) obtained based on the outputs from the force detectors. A mobile robot having the configuration as that of the mobile robot of the present invention generally includes the force detectors mounted on the respective movable links for operation control of the robot.

Thus, in the first step described above, the force detectors existing in the mobile robot, as they are, can be used to acquire each observed value of the respective contact detecting reference parameters, without the need of additional force detectors for acquiring each observed value of the respective contact detecting reference parameters.

Therefore, according to the first aspect of the present invention, it is possible to detect the presence or absence of occurrence of abnormal contact in real time appropriately with an inexpensive configuration.

In the first aspect of the present invention, the contact detecting model is preferably a model created using a one-class support vector machine (SVM) from sample data of the observed value of the respective ones of the contact detecting reference parameters collected during an operation of the mobile robot in a state of absence of occurrence of the abnormal contact (second aspect of the present invention).

This allows the contact detecting model to be created without the need of sample data of observed values of the respective contact detecting reference parameters in a situation where the abnormal contact has occurred. It is thus possible to create the contact detecting model while avoiding damage to the mobile robot as much as possible.

In the first aspect of the present invention, it is preferable that the contact detecting model is created for each of a plurality of types of operation patterns of the mobile robot, and that the contact detecting model used in the second step is a contact detecting model corresponding to the type of the operation pattern of the mobile robot during the operation (third aspect of the present invention).

With this, the abnormal contact to be detected by a contact detecting model is limited to the abnormal contact that occurs during the operation of the mobile robot in the operation pattern of the type corresponding to the contact detecting model. This enables detection of the presence or absence of occurrence of abnormal contact with high reliability during the operation of the mobile robot in various operation patterns.

In the third aspect of the present invention, it is preferable that the contact detecting model is configured to detect the presence or absence of occurrence of the abnormal contact by using the observed value of respective ones of the contact detecting reference parameters of types predetermined for each of the plurality of types of operation patterns of the mobile robot (fourth aspect of the present invention).

With this, for each of the plurality of types of operation patterns of the mobile robot, observed values of the optimal types of contact detecting reference parameters can be used to detect the presence or absence of occurrence of abnormal contact. This further enhances the reliability of the detection result about the presence or absence of occurrence of the abnormal contact.

In the first aspect of the present invention, it is preferable that the contact detecting model is configured to detect the presence or absence of occurrence of the abnormal contact from an integral value, obtained by integrating, for a period of a prescribed time span, an amount of deviation of an observed value of a respective one of the contact detecting reference parameters from a desired value of the corresponding one of the reference parameters defined by an operational goal of the mobile robot, or from a mean value, obtained by averaging the amount of deviation for a period of a prescribed time span (fifth aspect of the present invention).

It should be noted that although the "amount of deviation" may be a value, as it is, of deviation of an observed value of a respective one of the contact detecting reference parameters from a desired value of the corresponding one of the reference parameters defined by an operational goal of the mobile robot, it may be a value that changes monotonically (increases or decreases monotonically) with respect to the deviation, such as a value obtained by scale-converting the deviation as appropriate (a value obtained by multiplying the deviation by a prescribed value or a value obtained by dividing the deviation by a prescribed value), or a value obtained by offsetting the deviation.

Here, when the abnormal contact occurs, the above-described amount of deviation for each of the contact detecting reference parameters would likely increase. The integral value or the mean value described above would not likely be influenced by temporary noise included in the output from the force detector or the like. Therefore, according to the fifth aspect of the present invention, the presence or absence of occurrence of the abnormal contact can be detected with high reliability, from the integral value or the mean value, by the contact detecting model.

In the first aspect of the present invention, the method can further include a third step of, when occurrence of the abnormal contact is detected in the second step, identifying an abnormal contact site as a site of the mobile robot where the abnormal contact has occurred. In this case, it is preferable that in the third step, observed values of respective ones of a plurality of contact site identifying reference parameters are acquired based on outputs from the force detectors, the contact site identifying reference parameters including at least one of a contact reaction force of a respective one of one or more of the movable links and the aforesaid contact reaction force function value, and the observed value of the respective ones of the contact site identifying reference parameters is used to identify the abnormal contact site by a contact site identifying model created in advance (sixth aspect of the present invention).

According to various experiments and studies conducted by the present inventors, in the case where the abnormal contact occurs, at and around the time of occurrence thereof, high correlation is found between the component(s) of the contact reaction force(s) of any one or more movable links or the aforesaid contact reaction force function value and the site of the mobile robot where the abnormal contact has occurred.

Thus, when a plurality of reference parameters for use in identifying a contact site are selected appropriately from the contact reaction forces of all the movable links and the aforesaid contact reaction force function value, then the abnormal contact site can be identified appropriately with the third step described above.

In this case, as in the case of detecting the presence or absence of occurrence of abnormal contact, the existing force detectors in the mobile robot can be used, without modification, to acquire the observed value of the respective contact site identifying reference parameters.

Therefore, according to the sixth aspect of the present invention, it is possible to identify the abnormal contact site appropriately with an inexpensive configuration.

In the sixth aspect of the present invention, the contact site identifying model is preferably a model created using a multi-class support vector machine (SVM) from sample data of the observed value of the respective ones of the contact site identifying reference parameters collected during an operation of the mobile robot in a state of presence of occurrence of the abnormal contact (seventh aspect of the present invention).

This allows the contact site identifying model to be created relatively easily.

In the sixth aspect of the present invention, it is preferable that the contact site identifying model is created for each of a plurality of types of operation patterns of the mobile robot, and that the contact site identifying model used in the third step is a model corresponding to the type of the operation pattern of the mobile robot during the operation (eighth aspect of the present invention).

With this, the processing of identifying the abnormal contact site by a contact site identifying model is limited to the case where abnormal contact occurs during the operation of the mobile robot in the operation pattern of the type corresponding to the contact site identifying model. Accordingly, the abnormal contact site can be identified with high reliability when abnormal contact occurs during the operation of the mobile robot in various operation patterns.

In the eighth aspect of the present invention, it is preferable that the contact site identifying model is configured to identify the abnormal contact site by using observed values of the contact site identifying reference parameters of types predetermined for each of the plurality of types of operation patterns of the mobile robot (ninth aspect of the present invention).

With this, for each of the plurality of types of operation patterns of the mobile robot, observed values of the optimal types of contact site identifying reference parameters can be used to identify the abnormal contact site. This further enhances the reliability of the result of identification of the abnormal contact site.

It should be noted that the types of the contact site identifying reference parameters corresponding to each type of operation pattern of the mobile robot may be the same as the types of the contact detecting reference parameters corresponding to each type of operation pattern.

In the sixth aspect of the present invention, it is preferable that the contact site identifying model is configured to identify the abnormal contact site from an integral value, obtained by integrating, for a period of a prescribed time span, an amount of deviation of an observed value of a respective one of the contact site identifying reference parameters from a desired value of the corresponding one of the reference parameters defined by an operational goal of the mobile robot, or from a mean value, obtained by averaging the amount of deviation for a period of a prescribed time span (tenth aspect of the present invention).

As in the case of the fifth aspect of the present invention above, although the "amount of deviation" may be a value, as it is, of deviation of an observed value of a respective one of the contact site identifying reference parameters from a desired value of the corresponding one of the reference parameters defined by an operational goal of the mobile robot, it may be a value that changes monotonically with respect to the deviation, such as a value obtained by scale-converting the deviation as appropriate or a value obtained by offsetting the deviation.

According to the tenth aspect of the present invention, the abnormal contact site can be identified with high reliability, using the integral value or the mean value, by the contact site identifying model.

In the first aspect of the present invention, it is preferable that the method further includes a fourth step of, when occurrence of the abnormal contact is detected in the second step, causing the mobile robot to perform a response operation according to the detection, and that the response operation includes an operation of stopping motion of a movable link of the mobile robot in a state of being moved in the air, in a pattern determined in accordance with the type of the operation pattern of the mobile robot at the time of detection of occurrence of the abnormal contact (eleventh aspect of the present invention).

With this, when the occurrence of the abnormal contact is detected, the mobile robot is caused to perform the response operation including the operation of stopping the motion of the movable link in the state of being moved in the air of the mobile robot. This prevents an increase of damage to the mobile robot.

In the eleventh aspect of the present invention, the response operation may include, as the operation of stopping the motion of the movable link in the state of being moved in the air, an operation of stopping the motion of the movable link after causing a distal portion of the movable link to be landed on an external object earlier than in an operational goal of the mobile robot prior to occurrence of the abnormal contact. In this case, the method may further include: a fifth step of detecting presence or absence of occurrence of the abnormal contact while the distal portion of the movable link in the state of being moved in the air is moved according to the response operation; and a sixth step of, when occurrence of the abnormal contact is detected in the fifth step, causing the distal portion of the movable link in the state of being moved in the air to be lowered straight down for landing from a position at the time of detection of occurrence of the abnormal contact (twelfth aspect of the present invention).

With this, in the case where occurrence of the abnormal contact is not detected in the fifth step, the distal portion of the movable link in the state of being moved in the air can be moved for landing in a relatively smooth manner from the trajectory according to the original operational goal. Therefore, the distal portion of the movable link in the state of being moved in the air can be landed, while securing the continuity of the operation of the mobile robot.

On the other hand, when occurrence of the abnormal contact is detected in the fifth step, the distal portion of the movable link in the state of being moved in the air is lowered straight down for landing, so that the distal portion is landed in a shortest possible time. Consequently, the collapse in posture of the mobile robot due to the occurrence of the abnormal contact in the fifth step can be prevented as soon as possible.

A contact site identifying method for a mobile robot according to the present invention is for a mobile robot which includes a body, a plurality of movable links each extended from the body so as to be movable with respect to the body, and a force detector disposed on each movable link so as to be able to detect a contact reaction force acting on the movable link in accordance with contact of a distal portion of the movable link with an external object, and is movable with a motion including an operation in which at least one of the movable links is moved in the air and a succeeding operation in which the distal portion of the movable link is brought into contact with an external object, and the method includes:

an A step of detecting presence or absence of occurrence of abnormal contact in the mobile robot during an operation of the mobile robot; and a B step of, when occurrence of the abnormal contact is detected in the A step, identifying an abnormal contact site as a site of the mobile robot where the abnormal contact has occurred, wherein in the B step, an observed value of respective ones of a plurality of contact site identifying reference parameters is acquired based on outputs from the force detectors, the contact site identifying reference parameters including at least one of a contact reaction force of a respective one of one or more of the movable links and a contact reaction force function value expressed as a function value of a contact reaction force of a respective one of one or more of the movable links, and the observed value of the respective ones of the contact site identifying reference parameters is used to identify the abnormal contact site by a contact site identifying model created in advance (thirteenth aspect of the present invention).

According to the thirteenth aspect of the present invention, as in the sixth aspect of the present invention above, the abnormal contact site can be identified appropriately with an inexpensive configuration.

The thirteenth aspect of the present invention can further adopt the aspects similar to the seventh through twelfth aspects of the present invention described above.

Specifically, in the thirteenth aspect of the present invention, the contact site identifying model is preferably a model created using a multi-class support vector machine (SVM) from sample data of the observed value of the respective ones of the contact site identifying reference parameters collected during an operation of the mobile robot in a state of presence of occurrence of the abnormal contact (fourteenth aspect of the present invention).

Further, in the thirteenth aspect of the present invention, it is preferable that the contact site identifying model is created for each of a plurality of types of operation patterns of the mobile robot, and that the contact site identifying model used in the B step is a model corresponding to the type of the operation pattern of the mobile robot during the operation (fifteenth aspect of the present invention).

Further, in the fifteenth aspect of the present invention, it is preferable that the contact site identifying model is configured to identify the abnormal contact site by using observed values of the contact site identifying reference parameters of types predetermined for each of the plurality of types of operation patterns of the mobile robot (sixteenth aspect of the present invention).

Further, in the thirteenth aspect of the present invention, it is preferable that the contact site identifying model is configured to identify the abnormal contact site from an integral value, obtained by integrating, for a period of a prescribed time span, an amount of deviation of an observed value of a respective one of the contact site identifying reference parameters from a desired value of the corresponding one of the reference parameters defined by an operational goal of the mobile robot, or from a mean value, obtained by averaging the amount of deviation for a period of a prescribed time span (seventeenth aspect of the present invention).

Further, in the thirteenth aspect of the present invention, it is preferable that the method further includes a C step of, when occurrence of the abnormal contact is detected in the A step, causing the mobile robot to perform a response operation according to the detection, and that the response operation includes an operation of stopping motion of a movable link of the mobile robot in a state of being moved in the air, in a pattern determined in accordance with the type of the operation pattern of the mobile robot at the time of detection of occurrence of the abnormal contact (eighteenth aspect of the present invention).

Further, in the eighteenth aspect of the present invention, it is preferable that the response operation includes, as the operation of stopping the motion of the movable link in the state of being moved in the air, an operation of stopping the motion of the movable link after causing a distal portion of the movable link to be landed on an external object earlier than in an operational goal of the mobile robot prior to occurrence of the abnormal contact, and that the method further includes: a D step of detecting presence or absence of occurrence of the abnormal contact while the distal portion of the movable link in the state of being moved in the air is moved according to the response operation; and an E step of, when occurrence of the abnormal contact is detected in the D step, causing the distal portion of the movable link in the state of being moved in the air to be lowered straight down for landing from a position at the time of detection of occurrence of the abnormal contact (nineteenth aspect of the present invention).

BRIEF DESCRIPTION OF THE DRAWINGS

FIG. 3 is a diagram showing, by way of example, combinations of types of operation patterns of the mobile robot and types of reference parameters in the embodiment;

FIG. 4 is a diagram showing, by way of example, combinations of types of operation patterns of the mobile robot and stop operation patterns in the embodiment;

FIG. 7 is a flowchart illustrating the processing performed by the control device in the case where occurrence of abnormal contact is detected during the operation of the mobile robot in the embodiment.

DESCRIPTION OF THE PREFERRED EMBODIMENTS

Figure 1:
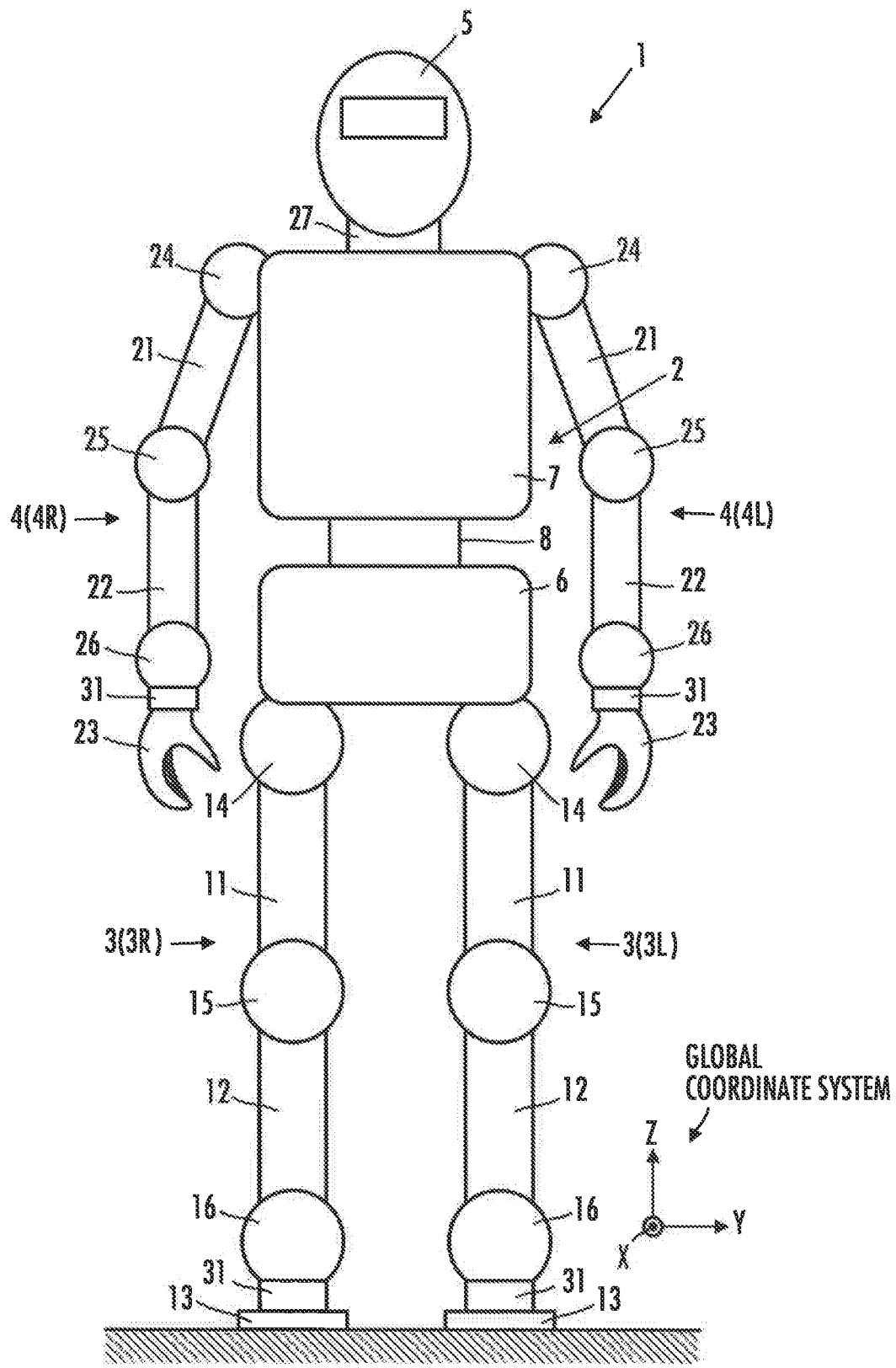
FIG. 1 is a diagram showing a schematic configuration of a mobile robot according to an embodiment of the present invention.

An embodiment of the present invention will be described below with reference to FIGS. 1 to 7. Referring to FIG. 1, a mobile robot 1 according to the present embodiment is a humanoid robot, for example. The mobile robot 1 (hereinafter, this may be simply referred to as robot 1) has a body 2, corresponding to an upper body, a pair of right and left (or, two) leg links 3R, 3L and a pair of right and left (or, two) arm links 4R, 4L as a plurality of (in the present embodiment, four) movable links extended from the body 2, and a head 5.

In the following description, when it is unnecessary to distinguish between the right and left leg links 3R and 3L, they are simply called leg links 3. Similarly, when it is unnecessary to distinguish between the right and left arm links 4R and 4L, they are simply called arm links 4. Further, each of the leg links 3R, 3L and the arm links 4R, 4L may be simply referred to as a movable link.

In the present embodiment, the body 2 is made up of a lower body 6 constituting the lower portion of the body 2, an upper body 7 constituting the upper portion of the body 2, and a joint mechanism 8 connecting the lower body 6 and the upper body 7. The joint mechanism 8 is configured to have degrees of freedom of rotation about one, two, or three axes, for example.

Each leg link 3 is extended from the lower portion (lower body 6) of the body 2. Each leg link 3 is composed of element links corresponding respectively to a thigh 11, a crus 12, and a foot 13, which are connected via a hip joint mechanism 14, a knee joint mechanism 15, and an ankle joint mechanism 16 in this order from the body 2 side. The foot 13 as a distal portion of each leg link 3 is a primary contact operation section which is brought into contact with an external object (ground surface, floor surface, wall surface, handrail, etc.) as appropriate during the traveling of the robot 1, for example, so as to be able to receive a contact reaction force that supports the robot 1.

It should be noted that the "contact reaction force that supports the robot 1" means, in more detail, a contact reaction force that acts against a resultant force of the gravitational force acting on the robot 1 and the inertial force generated by a motion of the robot 1.

In the present embodiment, the joint mechanisms 14, 15, and 16 arranged between the body 2 and the foot 13 of each leg link 3 are configured in such a manner that each leg link 3 has, for example, six degrees of freedom of motion.

For example, the hip joint mechanism 14 is configured with three joints (not shown) so as to have degrees of freedom of rotation about three axes in total. The knee joint mechanism 15 is configured with a single joint (not shown) so as to have a degree of freedom of rotation about one axis. The ankle joint mechanism 16 is configured with two joints (not shown) so as to have degrees of freedom of rotation about two axes in total.

It should be noted that in the description of the present embodiment, each "joint" constituting the joint mechanisms such as the above-described joint mechanisms 14, 15, and 16 refers to a revolute joint having a degree of freedom of rotation about one axis, unless otherwise specified. The "joint" has two members engaged so as to be rotatable relative to each other about the axis.

Each arm link 4 is extended from the upper portion (upper body 7) of the body 2. Each arm link 4 is composed of element links corresponding respectively to an upper arm 21, a forearm 22, and a hand 23, which are connected via a shoulder joint mechanism 24, an elbow joint mechanism 25, and a wrist joint mechanism 26 in this order from the body 2 side.

In the present embodiment, each arm link 4 is a movable link which may function as a leg when necessary. In this case, the hand 23 as a distal portion of each arm link 4 is a contact operation section which is brought into contact with an external object (ground surface, floor surface, wall surface, handrail, etc.) as appropriate so as to be able to receive a contact reaction force that supports the robot 1.

In the present embodiment, the joint mechanisms 24, 25, and 26 arranged between the body 2 and the hand 23 of each arm link 4 are configured in such a manner that each arm link 4 has, for example, six degrees of freedom of motion.

For example, the shoulder joint mechanism 24 is configured with three joints (not shown) so as to have degrees of freedom of rotation about three axes in total. The elbow joint mechanism 25 is configured with a single joint (not shown) so as to have a degree of freedom of rotation about one axis. The wrist joint mechanism 26 is configured with two joints (not shown) so as to have degrees of freedom of rotation about two axes in total.

Further, in the present embodiment, the hand 23 of each arm link 4 is configured to be able to grasp an object. For example, each hand 23 is configured with a clamping mechanism, or with a plurality of finger mechanisms capable of operating in a similar manner as human hand fingers.

The head 5 is attached on top of the body 2 via a neck joint mechanism 27. The neck joint mechanism 27 is configured to have degrees of freedom of rotation about one, two, or three axes, for example.

The above has outlined the mechanical configuration of the robot 1.

The robot 1 configured as described above can travel with a motion which includes an operation in which at least one movable link among the leg links 3R, 3L and the arm links 4R, 4L is moved in the air, not in contact with an external object, and a succeeding operation in which the distal portion (foot 13 or hand 23) of the movable link is brought into contact with an external object.

In this case, the robot 1 of the present embodiment is capable of traveling in various kinds of operation patterns. For example, the robot 1 can travel (or, perform a walking operation) in an operation pattern of biped gait in which the right and left leg links 3R and 3L are moved in a motion pattern similar to the human walking operation.

Further, for example, the robot 1 can also travel in an operation pattern in which, while the right and left leg links 3R and 3L are moved in the motion pattern similar to the one described above, one or both hands 23 of the arm links 4R and 4L are brought into contact with a wall, handrail, or the like for support as appropriate.

Further, for example, using the four movable links 3R, 3L, 4R, and 4L as legs, the robot 1 can travel in an operation pattern of quadruped gait in which the four movable links 3R, 3L, 4R, and 4L are moved in a motion pattern of trot, crawl, pace, or the like.

Furthermore, for example, the robot can ascend or descend a ladder or the like by using the four movable links 3R, 3L, 4R, and 4L.

Supplementally, each leg link 3 or each arm link 4 of the robot 1 may be configured to have seven or more degrees of freedom of motion. Further, the joints in each leg link 3 and in each arm link 4 are not limited to the revolute joints; they may include prismatic joints.

Further, in the case where the robot 1 is one that is not required to grasp an object by a hand 23, the distal portion of each arm link 4 may have a structure including no mechanism for a grasping operation. The body 2 may have an integral structure including no joint mechanism (with the lower body 6 and the upper body 7 integrated into one piece). The robot 1 may have no head 5, or the head 5 may be fixed to the upper end of the body 2.

A configuration related to the operation control of the robot 1 will now be described. In the following description, the foot 13 of each leg link 3 and the hand 23 of each arm link 4 may be generically referred to as a distal portion. Further, of the movable links 3, 4 of the robot 1, the movable link the distal portion of which is in contact with an external object so as to receive a contact reaction force that supports the robot 1 during the traveling of the robot 1 may be referred to as a supporting-leg movable link, and the movable link in a state of being moved in the air may be referred to as a free-leg movable link.

In this case, in the present embodiment, the free-leg movable link includes not only the movable link which is temporarily or periodically moved in the air, but also the movable link which is constantly kept in a state not contacting an external object during the traveling of the robot 1. For example, in the case where the robot 1 travels in the operation pattern of biped gait with each arm link 4 being kept from contacting an external object, not only the leg link 3 in the state of being moved in the air, but also both arm links 4R and 4L are the free-leg movable links.

Figure 2:
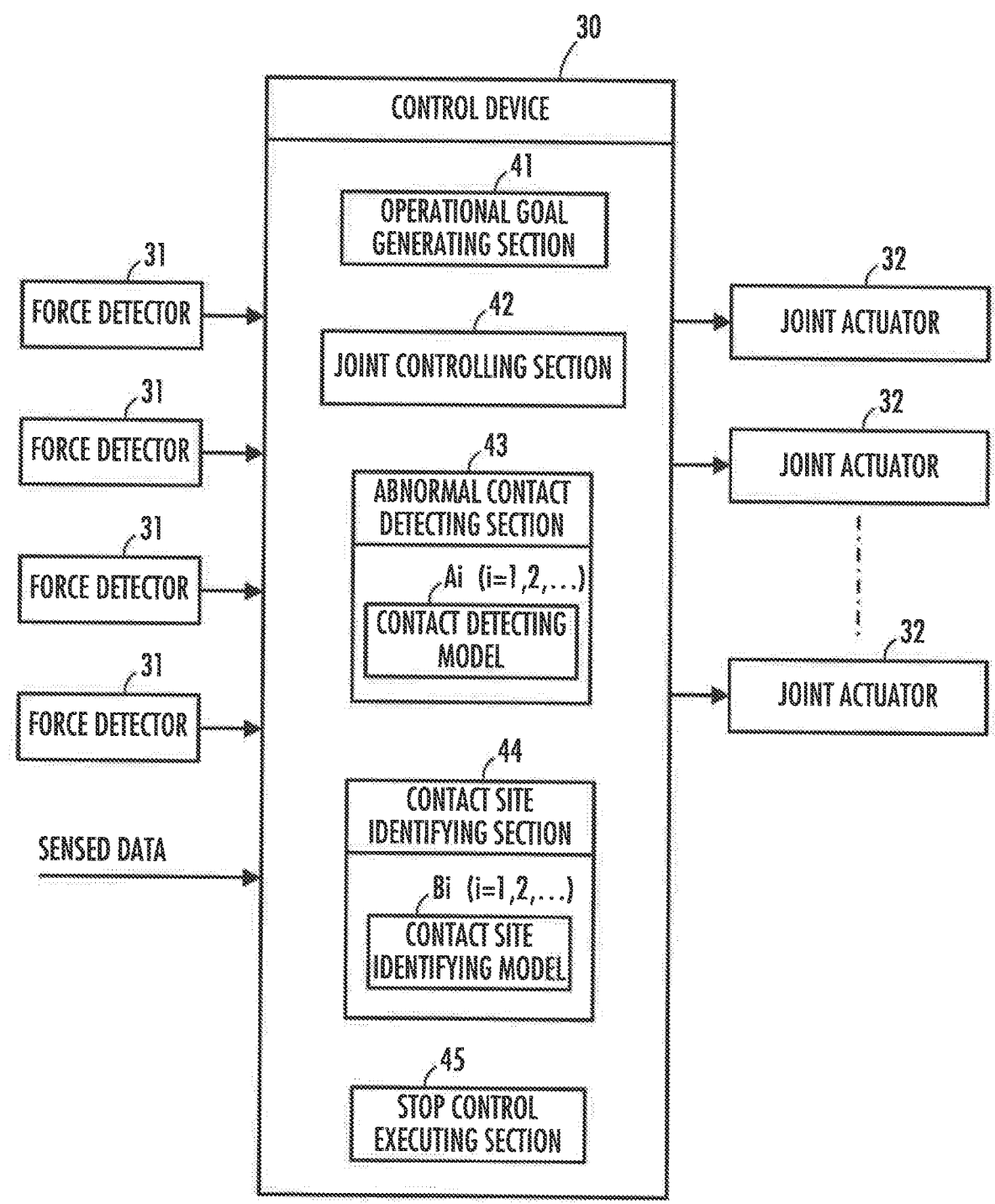
FIG. 2 is a block diagram showing a configuration related to the operation control of the mobile robot in the embodiment.

As shown in FIG. 2, the robot 1 is provided with: a control device 30 which has a function of performing operation control of the robot 1, force detectors 31 mounted on the respective movable links 3, 4 so as to be able to detect a contact reaction force acting on the distal portion 13, 23 of the corresponding movable link 3, 4 when the distal portion 13, 23 is brought into contact with an external object, and joint actuators 32 which drive the respective joints of the robot 1.

In the present embodiment, each force detector 31 is a detector configured to be able to detect, as the contact reaction force acting on the distal portion 13, 23 of the movable link 3, 4 on which the force detector 31 is mounted, a set of three-dimensional translational force vector and three-dimensional moment vector (rotational force vector).

Specifically, each force detector 31 is configured with a six-axis force sensor, for example. The force detector 31 of each leg link 3 is interposed between the distal portion 13 (foot 13) of the leg link 3 and the ankle joint mechanism 16 including the most distal joint of the leg link 3, as shown in FIG. 1, for example. The force detector 31 of each arm link 4 is interposed between the distal portion 23 (hand 23) of the arm link 4 and the wrist joint mechanism 26 including the most distal joint of the arm link 4, as shown in FIG. 1, for example.

A joint actuator 32 is disposed for each joint, and is made up of an electric motor or a hydraulic actuator, for example. In this case, the mechanism for driving a joint by each joint actuator 32 may have a known structure. The joint actuator 32 is not limited to a rotary actuator, but may be a linear actuator.

The control device 30 is configured with one or more electronic circuit units including CPU, RAM, ROM, interface circuit, etc. The control device 30 is placed in an appropriate position (for example, in the lower body 6 or the upper body 7) of the robot 1.

The control device 30 receives detection signals output from the force detectors 31, and also receives various kinds of sensed data. For example, the sensed data indicating external conditions (such as the position and shape of an external object) surrounding the robot 1, inclination of the reference site (for example, the lower body 6) of the robot 1 with respect to the vertical direction (gravitational force direction) or the horizontal plane, the amount of displacement (rotational angle) of each joint of the robot 1, etc. are input to the control device 30 from various sensors mounted on the robot 1 or from sensing systems outside the robot 1. Further, the control device 30 is able to communicate with an external server or controlling device as appropriate.

The control device 30 includes, as functions implemented by installed hardware configurations or programs (software configurations): an operational goal generating section 41 which generates an operational goal of the robot 1; a joint controlling section 42 which controls operations of the joints of the robot 1, via the corresponding joint actuators 32, in accordance with the operational goal; an abnormal contact detecting section 43 which detects the presence or absence of occurrence of abnormal contact of the robot 1 with an external object; a contact site identifying section 44 which, when occurrence of abnormal contact is detected, identifies a site (hereinafter, referred to as abnormal contact site) of the robot 1 at which the abnormal contact has occurred; and a stop control executing section 45 which performs control to stop the operation of the robot 1 when occurrence of the abnormal contact is detected.

The operational goal generated by the operational goal generating section 41 is a goal which may define the operation of the robot 1. The operational goal includes a goal related to a motion of the robot 1 (spatial movement of the entire robot 1), and a goal related to an external force to be acted on the robot 1.

The goal related to the motion (hereinafter, referred to as desired motion) includes, for example, trajectories of desired position and desired posture of a respective one of the distal portions 13, 23 of the movable links 3, 4 of the robot 1, trajectories of desired position and desired posture of the reference site (for example, the lower body 6 or the upper body 7) of the robot 1, a trajectory of desired value of posture (orientation) of one of the lower body 6 and the upper body 7 relative to the other, and a trajectory of desired value of posture (orientation) of the head 5 relative to the upper body 7. It should be noted that the "trajectory" means a time series of instantaneous values.

Further, the goal related to the external force includes, for example, a trajectory of desired position of the zero moment point (ZMP) (hereinafter, referred to as desired ZMP) of the robot 1, and a trajectory of desired value of a contact reaction force to be acted by an external object on a respective one of the distal portions 13, 23 of the movable links 3, 4.

The operational goal generating section 41 generates the operational goal, on the basis of an operation command provided from an external controlling device or server (or an operation schedule taught in advance) and the sensed data including the external conditions of the robot 1, so as to cause the robot 1 to perform the operation designated by the operation command or the operation schedule.

It should be noted that the desired motion of the robot 1 and the goal related to the external force are generated so as to be able to fulfill required dynamic relations.

The joint controlling section 42 generates a trajectory of desired displacement amount of each joint of the robot 1, in accordance with the operational goal, so as to achieve the operational goal. The desired displacement amount of each joint refers to a desired value of rotational displacement amount for a revolute joint, and a desired value of translational displacement amount for a prismatic joint.

In this case, for example, the joint controlling section 42 corrects the desired motion among the operational goal as appropriate, in accordance with the detection value of the inclination of the reference site of the robot 1 and a deviation between the detection value and the desired value of the contact reaction force of each supporting-leg movable link 3 or 4, and, from the desired motion thus corrected, generates a trajectory of desired displacement amount of each joint by arithmetic processing of inverse kinematics.

The joint controlling section 42 then performs feedback control of the displacement amount of each joint, via the corresponding joint actuator 32, to cause the actual displacement amount (detection value) of each joint to follow the desired displacement amount.

The "abnormal contact" detected by the abnormal contact detecting section 43 is, in the present embodiment, contact of a free-leg movable link 3 or 4, among the movable links 3 and 4, with an external object (the contact being unexpected in the operational goal of the robot 1).

The abnormal contact detecting section 43 uses a plurality of parameters related to the contact reaction force of one or more movable links 3, 4 as reference parameters (parameters to be referenced), and detects the presence or absence of occurrence of the abnormal contact during the operation of the robot 1 by using the observed values (detection values or estimates) of those reference parameters.

In more detail, in the present embodiment, the abnormal contact detecting section 43 sequentially acquires observed values and desired values of the respective reference parameters, and sequentially calculates error integral values (described below) from the observed values and the desired values of the respective reference parameters. Then, from the error integral values, the abnormal contact detecting section 43 detects the presence or absence of occurrence of abnormal contact by using a contact detecting model Ai (i=1, 2, . . . ) created in advance.

In this case, in the present embodiment, to detect the presence or absence of occurrence of abnormal contact and to identify the abnormal contact site, operation patterns (modes of operation) of the robot 1 have been classified into a plurality of types in advance. For each type of operation pattern of the robot 1, the types of parameters for use as the reference parameters in the processing of the abnormal contact detecting section 43 have been predetermined, and a contact detecting model Ai (i=1, 2, . . . ) has also been created in advance for each type of operation pattern of the robot 1. Here, the suffix "i" (i=1, 2, . . . ) to the reference character is an identification number for discriminating the type of the operation pattern of the robot 1.

Specifically, the parameters that can be used as the above-described reference parameters are one or both of: a contact reaction force of a respective one of one or more movable links 3, 4; and a contact reaction force function value that can be expressed as a function value of a contact reaction force of a respective one of one or more movable links 3, 4.

In this case, in the present embodiment, the "contact reaction force" that can be used as the reference parameter is, in more detail, coordinate axis components of both of translational force vector and moment vector of the contact reaction force observed in a global coordinate system.

The global coordinate system is a coordinate system designed and set as appropriate for an outside world as an operating environment of the robot 1 so as to express the location of the robot 1 in the operating environment of the robot 1, the position of contact of a movable link 3, 4 of the robot 1 with an external object, etc. For the global coordinate system, a three-axis orthogonal coordinate system (XYZ coordinate system) having a Z axis in a vertical direction (gravitational force direction) and an X axis and a Y axis in horizontal axis directions orthogonal to each other, as shown in 1, for example, is used.

In the description of the present embodiment, the X axis direction of the global coordinate system corresponds to, for example, the front-and-rear direction (perpendicular to the paper plane of FIG. 1) of the lower body 6 in the state where the robot 1 is projected on the horizontal plane, or the traveling direction of the robot 1 in the state where the robot 1 is projected on the horizontal plane.

The contact reaction force observed in such a global coordinate system is composed of six components of: X axis component Fx, Y axis component Fy, and Z axis component Fz of the translational force vector, and component Mx about the X axis, component My about the Y axis, and component Mz about the Z axis of the moment vector. Each of these six components is a parameter that can be used as the reference parameter.

It should be noted that the observed value of the contact reaction force of each movable link 3, 4 observed in the global coordinate system is a detection value which is obtained, for each movable link 3 or 4, by subjecting the contact reaction force detected on the basis of an output from the force detector 31 (detection value of the contact reaction force observed in a local coordinate system that has been set for each force detector 31) to coordinate transformation into the global coordinate system.

Further, the desired value of the contact reaction force of each movable link 3, 4 observed in the global coordinate system is a desired value defined by the operational goal of the robot 1.

Further, in the present embodiment, the "contact reaction force function value" that can be used as the reference parameter is, for example, an amount of change per unit time of a respective one of the coordinate axis components of the actual position (positional vector) of the ZMP of the robot 1 observed in the global coordinate system (i.e. the X axis position, Y axis position, and Z axis position of the ZMP), or in other words, an X axis component DZMPx, a Y axis component DZMPy, and a Z axis component DZMPz of the amount of change per unit time of the position of the ZMP (hereinafter, referred to as ZMP change rate) of the robot 1.

Here, the ZMP may be defined as a point at which the moment about the horizontal axis directions (direction about the X axis and direction about the Y axis of the global coordinate system) produced about that point by the entirety (resultant force) of the contact reaction forces of the respective supporting-leg movable links among the four movable links 3R, 3L, 4R, and 4L becomes zero. Therefore, the position of the ZMP observed in the global coordinate system and, hence, its change amount per unit time (ZMP change rate) may be expressed as a function value of the contact reaction force(s) of one or more movable links 3, 4. Accordingly, the ZMP change rate can be used as the contact reaction force function value.

It should be noted that the observed value of the position of the ZMP observed in the global coordinate system can be calculated sequentially by a prescribed arithmetic expression, by using a detection value of the contact reaction force of a respective one of the supporting-leg movable links and estimates of the actual position and posture (or desired position and desired posture) of the distal portion (foot 13 or hand 23) of the respective one of the supporting-leg movable links. Then, the change amount per unit time of the observed value of the position of the ZMP can be obtained as the observed value of the ZMP change rate.

Further, the desired value of the ZMP change rate observed in the global coordinate system can be obtained as the change amount per unit time of the desired ZMP that is defined by the operational goal of the robot 1.

In the present embodiment, the parameters used as the above-described reference parameters in each type of operation pattern of the robot 1 have been selected in advance, for each type of operation pattern of the robot 1, from the six components (Fx, Fy, Fz, Mx, My, Mz) of the contact reaction force of a respective one of the four movable links 3R, 3L, 4R, and 4L, and the three components DZMPx, DZMPy, and DZMPz of the ZMP change rate as the contact reaction force function value.

In this case, the reference parameters corresponding to each type of operation pattern of the robot 1 have been selected in advance, on the basis of experiments or simulations, in such a manner that the situation in which abnormal contact has occurred and the situation in which no abnormal contact has occurred during the operation of the robot 1 in that operation pattern can suitably be recognized distinguishably on the basis of the observed values and desired values of those reference parameters.

FIG. 3 illustrates combinations of the types of operation patterns of the robot 1 and the types of reference parameters corresponding to the respective types of operation patterns.

Of the types of operation patterns illustrated in FIG. 3, "quadrupedal movement" is an operation pattern in which the robot 1 uses four movable links 3R, 3L, 4R, and 4L as legs, and travels by moving the four movable links 3R, 3L, 4R, and 4L in a motion pattern of trot, crawl, pace, or the like.

In this operation pattern of "quadrupedal movement", for example, fourteen parameters in total, i.e. the component Mz about the Z axis of the moment and the horizontal axis components Fx and Fy of the translational force of the contact reaction force of each movable link 3, 4, and the horizontal axis components DZMPx and DZMPy of the ZMP change rate, are used as the reference parameters.

In this case, in the operation pattern of "quadrupedal movement", even in the absence of abnormal contact, especially the components Mx and My about the horizontal axes of the moment and the Z axis component Fz of the translational force of the contact reaction force of each movable link 3, 4 may take values varying over a wide range due to various surface conditions of the external object (floor surface, ground surface, etc.) with which the distal portion 13, 23 of each movable link 3, 4 is brought into contact. Thus, of the contact reaction force of each movable link 3, 4, the three components Mx, My, and Fz are excluded from the reference parameters.

The operation pattern of "bipedal movement+touching wall with hands" is an operation pattern in which the robot 1 travels by moving the two leg links 3R and 3L in a motion pattern identical to or analogous to the walking operation, while touching a wall with the hands 23 of the two arm links 4R and 4L as appropriate.

The reference parameters used in this operation pattern of "bipedal movement+touching wall with hands" are the same as those used in the operation pattern of "quadrupedal movement" (the fourteen reference parameters in total). In this case, of the contact reaction force of each movable link 3, 4, the three components Mx, My, and Fz are excluded from the reference parameters for the same reasons as in the operation pattern of "quadrupedal movement".

"Bipedal movement (without touching with hands)" is an operation pattern in which the robot 1 travels by moving the two leg links 3R and 3L in a motion pattern identical to or analogous to the walking operation, while keeping each arm link 4 from contacting an external object.

In this operation pattern of "bipedal movement (without touching with hands)", for example, twenty parameters in total, i.e. the six components Mx, My, Mz, Fx, Fy, and Fz of the contact reaction force of each arm link 4, the component Mz about the Z axis of the moment and the horizontal axis components Fx and Fy of the translational force out of the six components of the contact reaction force of each leg link 3, and the horizontal axis components DZMPx and DZMPy of the ZMP change rate, are used as the reference parameters.

In this case, the three components Mx, My, and Fz of the contact reaction force of each leg link 3 are excluded from the reference parameters for the same reasons as in the operation pattern of "quadrupedal movement".

Further, in the present embodiment, in the operation pattern of "bipedal movement (without touching with hands)", the six components Mx, My, Mz, Fx, Fy, and Fz of the contact reaction force of each arm link 4 are included in the reference parameters so as to be able to detect, not only the abnormal contact of a leg link 3 during movement in the air, but also the presence or absence of occurrence of abnormal contact of each arm link 4 which constantly serves as a free-leg movable link in this operation pattern.

Further, "bipedal movement+opening/closing door" is an operation pattern in which the robot opens/closes a door, while moving the two leg links 3R and 3L in a motion pattern identical to or analogous to the walking operation for traveling, by bringing one or both hands 23 of the arm links 4 into contact with the door knob.

In this operation pattern of "bipedal movement+opening/closing door", for example, eight parameters in total, i.e. the component Mz about the Z axis of the moment and the horizontal axis components Fx and Fy of the translational force out of the six components of the contact reaction force of each leg link 3, and the horizontal axis components DZMPx and DZMPy of the ZMP change rate, are used as the reference parameters.

In this case, the three components Mx, My, and Fz among the six components of the contact reaction force of each leg link 3 are excluded from the reference parameters for the same reasons as in the operation pattern of "quadrupedal movement".

Further, the six components of the contact reaction force of each arm link 4 may take values varying over a wide range due to the manner in which the hand 23 of each arm link 4 contacts the door or the like. Thus, in the operation pattern of "bipedal movement+opening/closing door", all the six components Mx, My, Mz, Fx, Fy, and Fz of the contact reaction force of each arm link 4 are excluded from the reference parameters.

Further, "reaching ladder" is an operation pattern in which the robot grabs ladder rungs or the like with the hands 23 of the respective arm links 4R and 4L before starting ascending/descending the ladder.

In this operation pattern of "reaching ladder", for example, seven parameters in total, i.e. the Z axis component Fz of the translational force vector out of the six components of the contact reaction force of each arm link 4, the component My about the Y axis of the moment vector (pitch direction component of the robot 1) and the Z axis component Fz of the translational force out of the six components of the contact reaction force of each leg link 3, and the X axis component DZMPx of the ZMP change rate, are used as the reference parameters.

In this operation pattern of "reaching ladder", if an arm link 4 fails to grab a ladder rung or the like with the hand 23, the Z axis component Fz of the translational force among the six components of the contact reaction force of a leg link 3 or an arm link 4, or the component My about the Y axis of the moment (pitch direction component) among the six components of the contact reaction force of a leg link 3, or the X axis component DZMPx of the ZMP change rate, is liable to take an unexpected (abnormal) value.

Thus, Fz of each arm link 4, My and Fz of each leg link 3, and DZMPx are used as the reference parameters in the operation pattern of "reaching ladder".

Further, "ascending/descending stairs with handrail" is an operation pattern in which the robot ascends/descends stairs by moving the two leg links 3R and 3L in a motion pattern identical to or analogous to the walking operation, while grabbing the handrail with one or both hands 23 of the arm links 4 as appropriate.

In this operation pattern of "ascending/descending stairs with handrail", for example, fourteen parameters in total, i.e. the three components Fx, Fy, and Fz of the contact reaction force of each arm link 4, the component Mz about the Z axis of the moment and the horizontal axis components Fx and Fy of the translational force out of the six components of the contact reaction force of each leg link 3, and the horizontal axis components DZMPx and DZMPy of the ZMP change rate, are used as the reference parameters.

In this case, the three components Mx, My, and Fz among the six components of the contact reaction force of each leg link 3 are excluded from the reference parameters for the same reasons as in the operation pattern of "quadrupedal movement".

Further, upon grabbing a handrail with a hand 23, the three components Mx, My, and Mz of the contact reaction force of the arm link 4 may take values varying over a wide range due to the manner in which the hand 23 contacts the handrail or the like. Thus, in the operation pattern of "ascending/descending stairs with handrail", the three components Mx, My, and Mz of the contact reaction force of each arm link 4 are excluded from the reference parameters.

Further, "ascending/descending ladder" is an operation pattern in which the robot ascends/descends a ladder by moving the four movable links 3R, 3L, 4R, and 4L in a motion pattern similar to that of the crawl or other motion pattern, while bringing the distal portions 13, 23 of the respective movable links 3, 4 into contact with the ladder rungs as appropriate.

In this operation pattern of "ascending/descending ladder", for example, seventeen parameters in total, i.e. four components Fx, Fy, Mx, and Mz of the contact reaction force of each movable link 3, 4, and the Y axis component DZMPy of the ZMP change rate, are used as the reference parameters.

In this case, in the operation pattern of "ascending/descending ladder", the component My about the Y axis of the moment and the Z axis component Fz of the translational force of the contact reaction force of each movable link 3, 4 may take values varying over a wide range. Thus, the two components My and Fz of the contact reaction force of each movable link 3, 4 are excluded from the reference parameters.

Further, in the operation pattern of "ascending/descending ladder", upon occurrence of failure in grabbing or stepping on a ladder rung, the component Mx about the X axis of the moment (roll direction component) among the six components of the contact reaction force of a leg link 3 or an arm link 4 would be affected considerably.

Thus, of the contact reaction force of each movable link 3, 4, Mx is included in the reference parameters for the operation pattern of "ascending/descending ladder".

As described above, the types of reference parameters for use as the parameters to be referenced have been selected in advance for each type of operation pattern of the robot 1. While the Z axis component DZMPz of the ZMP change rate is not used as the reference parameter in each type of operation pattern shown in FIG. 3, DZMPz can be used as a reference parameter in some types of operation patterns.

During the operation of the robot 1 in each type of operation pattern, the abnormal contact detecting section 43 acquires observed values and desired values of the respective reference parameters corresponding to that type of operation pattern (reference parameters of the types selected in advance as the parameters to be referenced for that type of operation pattern), and detects the presence or absence of occurrence of abnormal contact by using a contact detecting model Ai created in advance for that type of operation pattern.

Specifically, in the present embodiment, the abnormal contact detecting section 43 sequentially calculates a deviation between a normalized observed value and a normalized desired value, which are obtained by dividing an observed value and a desired value of a respective one of the reference parameters corresponding to the type of operation pattern of the robot 1 by a reference value predetermined for each type of reference parameter. The deviation corresponds to an error of the observed value of the reference parameter with respect to the desired value.

In this case, the reference value for each type of reference parameter is, for example, a value which is set in advance on the basis of the measured data of the reference parameter or the like, in such a manner that the magnitude (absolute value) of each of the observed value and the desired value of each type of reference parameter becomes not greater than the reference value (in other words, in such a manner that the absolute value of each of the normalized observed value and the normalized desired value does not exceed "1").

Then, the abnormal contact detecting section 43 sequentially calculates an integral value (hereinafter, referred to as error integral value) by integrating the deviation for each prescribed time span, and, on the basis of this error integral value, detects the presence or absence of occurrence of abnormal contact by using a contact detecting model Ai corresponding to the type of the operation pattern of the robot 1.

In this case, each contact detecting model Ai is configured to be able to sequentially determine information (hereinafter, referred to as abnormal contact evaluation information) for evaluating whether abnormal contact has occurred or not, from the error integral values (more specifically, a set of the error integral values of the respective reference parameters corresponding to the type of operation pattern) calculated in the above-described manner during the operation of the robot 1 in the corresponding type of operation pattern.

For example, the reference parameters corresponding to the operation pattern of "quadrupedal movement" described above are, as shown in FIG. 3, fourteen reference parameters in total of: Mz, Fx, and Fy of the contact reaction forces of the respective four movable links 3R, 3L, 4R, and 4L, and DZMPx and DZMPy of the ZMP change rate. In this case, the contact detecting model Ai corresponding to the "quadrupedal movement" is configured to be able to determine the abnormal contact evaluation information from the error integral values of the respective ones of the fourteen reference parameters (a set of the error integral values of fourteen types in total).

In the present embodiment, such a contact detecting model Ai has been created in advance, for each type of operation pattern of the robot 1, by using a supervised classification technique, for example a one-class support vector machine (SVM).

In this creating task, while the robot 1 is being caused to actually operate in each type of operation pattern in various operating environments, sampling data of the above-described error integral values of the respective reference parameters corresponding to the type of operation pattern of the robot 1 are collected as training data. In this case, the sampling data being collected are sampling data in the situation where it has been confirmed that no abnormal contact has occurred. Then, for each type of operation pattern, the contact detecting model Ai is created from the collected training data, by the one-class SVM.

In this case, using the one-class SVM makes it possible to create a contact detecting model Ai without the need of training data in the situation where abnormal contact as described above has actually occurred. This can avoid as much as possible the risk of damaging the robot 1 in the course of collecting training data.

Supplementally, in the task of creating a contact detecting model Ai, the combination of the types of reference parameters for which training data are to be collected may be changed as appropriate for each type of operation pattern of the robot 1, and the performance of the contact detecting model Ai created on the basis of the training data collected in accordance with the resultant combination (or, the reliability of the above-described abnormal contact evaluation information generated by the resultant contact detecting model Ai) may be assessed. Then, on the basis of the assessment, the types of reference parameters corresponding to each type of operation pattern ay be determined in an exploratory manner so as to be able to enhance the performance of the contact detecting model Ai corresponding to each type of operation pattern as much as possible. In doing so, the reference parameters of the types suitable for detecting the presence or absence of occurrence of abnormal contact can be selected for each type of operation pattern, in an exploratory manner.

In the present embodiment, each contact detecting model Ai used by the abnormal contact detecting section 43 is a model created in the above-described manner for each type of operation pattern of the robot 1.

These contact detecting models Ai (i=1, 2, . . . ) are stored in the form of database in the storage section of the control device 30 or in an external server. The abnormal contact detecting section 43 is able to acquire the contact detecting model Ai corresponding to each type of operation pattern as appropriate by reading the model from the storage section of the control device 30 or by downloading the model from the external server.

In the case where occurrence of the abnormal contact is detected by the abnormal contact detecting section 43, the contact site identifying section 44 uses the observed values of the required reference parameters, for each type of operation pattern of the robot 1, to identify an abnormal contact site (where the abnormal contact has occurred).

In more detail, in the present embodiment, in the case where occurrence of the abnormal contact is detected by the abnormal contact detecting section 43, the contact site identifying section 44 acquires the above-described error integral values (at the time of detection of occurrence of abnormal contact) for the respective ones of the required reference parameters (reference parameters for use as the parameters to be referenced for identifying the abnormal contact site), and, from the acquired error integral values, identifies the abnormal contact site by using a contact site identifying model Bi (i=1, 2, . . . ) created in advance for each type of operation pattern of the robot 1.

Here, in the present embodiment, identifying the abnormal contact site means, in more detail, identifying the movable link 3 or 4 to which the abnormal contact site belongs (hereinafter, this link will be referred to as abnormal contact source movable link), and also identifying the position in the abnormal contact source movable link 3 or 4 where the abnormal contact site is located.

In this case, the movable link 3 or 4 identified as the abnormal contact source movable link is, in more detail, a free-leg movable link in the state of being moved in the air.

Further, as for identifying the position of the abnormal contact site in the abnormal contact source movable link, in the present embodiment, the position of the abnormal contact site is identified, for example, as one of three types of positions of: a position within a region closer to the body 2 of the abnormal contact source movable link (hereinafter, referred to as position in the body-side region), a position within a region closer to the distal end of the abnormal contact source movable link (hereinafter, referred to as position in the distal-side region), and a position within a region between the body-side region and the distal-side region (hereinafter, referred to as position in the middle region).

Further, in the present embodiment, for each type of operation pattern of the robot 1, the types of the reference parameters for use as the parameters to be referenced for identifying the abnormal contact site are the same as the types of the reference parameters used in the processing of the abnormal contact detecting section 43.

For example, the reference parameters used for identifying the abnormal contact site when occurrence of abnormal contact is detected during the operation of the robot 1 in the "quadrupedal movement" operation pattern are, as in the case of detecting the presence or absence of occurrence of abnormal contact, fourteen reference parameters in total of: Mz, Fx, and Fy of the contact reaction forces of the respective four movable links 3R, 3L, 4R, and 4L, and DZMPx and DZMPy of the ZMP change rate.

Therefore, in the present embodiment, the contact site identifying section 44 acquires from the abnormal contact detecting section 43 the error integral values of the respective reference parameters (corresponding to the type of operation pattern of the robot 1) calculated in the abnormal contact detecting section 43 at the time of detection of occurrence of abnormal contact.

It should be noted that the contact site identifying section 44 may be configured to perform processing of sequentially calculating error integral values of the respective reference parameters, and acquire the error integral values of the reference parameters that the contact site identifying section 44 has calculated at the time of detection of occurrence of the abnormal contact by the abnormal contact detecting section 43.

The contact site identifying section 44 then identifies the abnormal contact site from the error integral values of the respective reference parameters at the time of detection of occurrence of the abnormal contact, by using a contact site identifying model Bi corresponding to the type of the operation pattern of the robot 1.

In this case, the contact site identifying model Bi corresponding to each type of operation pattern of the robot 1 is configured to determine, from the error integral values of the reference parameters corresponding to the type of the operation pattern, information indicating which movable link the abnormal contact source movable link is (hereinafter, referred to as contact movable link identification information) and information indicating in which position in the abnormal contact source movable link the abnormal contact site is located (hereinafter, referred to as contact position identification information).

In the present embodiment, such a contact site identifying model Bi is created in advance, for each type of operation pattern of the robot 1, by using a supervised classification technique, for example a multi-class SVM.

In this creating task, while the robot 1 is being caused to actually operate in each type of operation pattern in various operating environments, sampling data of the error integral values of the respective reference parameters in the situation where respective portions (body-side region, middle region, and distal-side region) of a free-leg movable link in the state of being moved in the air are brought into contact with an external object are collected as training data. Then, for each type of operation pattern, the contact site identifying model Bi is created from the collected training data, by the multi-class SVM.

In this case, using the multi-class SVM makes it possible to appropriately create a contact site identifying model Bi that can identify the abnormal contact source movable link and also identify the position of the abnormal contact site in the abnormal contact source movable link.

Supplementally, the types of reference parameters for use as the parameters to be referenced for identifying the abnormal contact site may be selected in an exploratory manner, similarly as described supplementally regarding the task of creating the contact detecting model Ai.

In the case where occurrence of abnormal contact is detected by the abnormal contact detecting section 43 during an operation of the robot 1, the stop control executing section 45 controls the joints of the robot 1, via the corresponding joint actuators 32, so as to cause the traveling operation of the robot 1 to be stopped in a prescribed stop operation pattern according to the type of the operation pattern of the robot 1.

FIG. 4 illustrates stop operation patterns corresponding to the respective types of operation patterns of the robot 1 illustrated in FIG. 3.

In this example, "quadrupedal movement" is further divided into high-speed movement in the trot mode, low-speed movement in the trot mode, and movement in the crawl mode.

Here, of the stop operation patterns shown in FIG. 4, "locking joints" is an operation in which displacement of each joint of a prescribed movable link defined in accordance with the type of operation pattern of the robot 1 at the time of detection of occurrence of abnormal contact is stopped forcibly (or, the displacement amount of each joint of the prescribed movable link is fixed to the amount equal to or almost equal to the displacement amount at the time of detection of occurrence of the abnormal contact).

With this "locking joints", the position and posture of the distal portion of the target movable link are kept constant after the detection of occurrence of the abnormal contact. For example, in the case where the movable link as a target of "locking joints" is a leg link 3 in the state of being moved in the air (leg link 3 serving as a free-leg movable link), the height of the distal portion (foot 13) of the leg link 3 is kept constant after the detection of occurrence of the abnormal contact, as illustrated in the graph in FIG. 5A. In the case where the movable link as a target of "locking joints" is a supporting-leg movable link, the distal portion of the movable link is kept in the state in contact with the external object.

Further, of the stop operation patterns shown in FIG. 4, "landing free leg on the spot" is an operation in which the distal portion of a prescribed free-leg movable link defined in accordance with the type of operation pattern of the robot 1 at the time of detection of occurrence of the abnormal contact is lowered almost vertically straight down for landing from its position at the time of detection of occurrence of the abnormal contact.

Figure 5A:
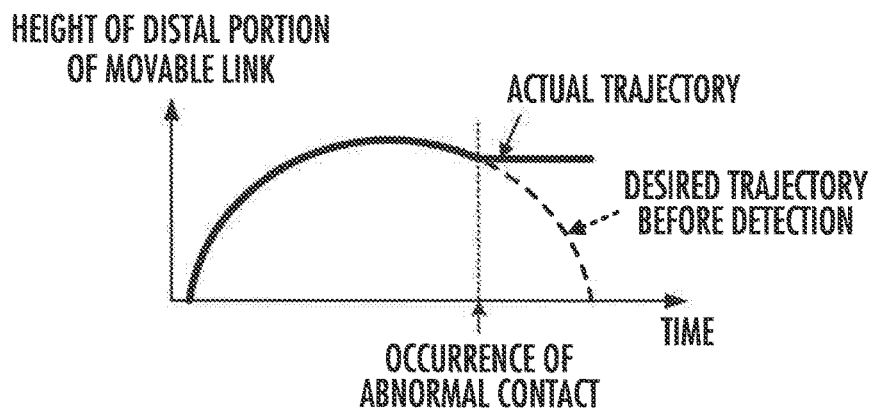
FIGS. 5A, 5B, and 5C are graphs illustrating the manners of operation of movable links in the respective types of stop operation patterns shown in FIG. 4.
Figure 5B:
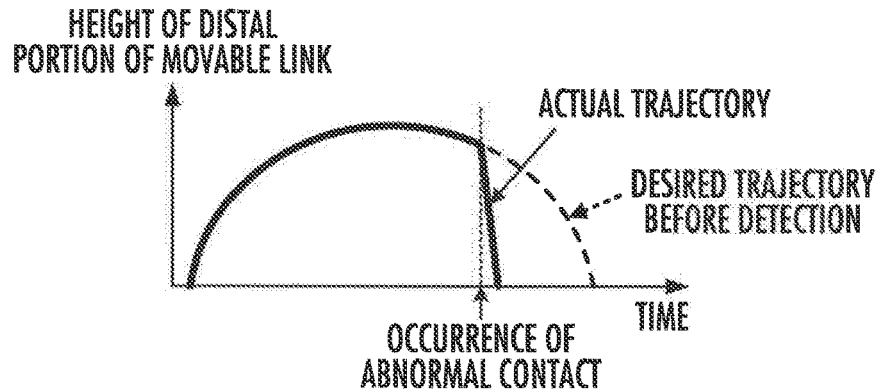

In this "landing free leg on the spot", after the detection of occurrence of the abnormal contact, the respective joints of the target free-leg movable link (for example, leg link 3) are driven via the corresponding joint actuators 32 so as to cause the distal portion of the free-leg movable link to quickly move onto the surface (floor surface, ground surface, etc.) of the external object immediately beneath it for landing, as illustrated in the graph in FIG. 5B, for example.

While FIG. 5B illustrates the case where the distal portion of the free-leg movable link is lowered at constant speed, it may be configured such that, for example, the speed is reduced when the distal portion of the free-leg movable link approaches the surface of the external object to some extent.

Further, of the stop operation patterns shown in FIG. 4, "real-time stop operation" is an operation in which the distal portion of a prescribed free-leg movable link defined in accordance with the type of operation pattern of the robot 1 at the time of detection of occurrence of the abnormal contact is moved for landing from its position at the time of detection of occurrence of the abnormal contact along trajectories (of desired position and desired posture of the distal portion of the free-leg movable link) that are generated to allow the distal portion to land quickly (specifically, earlier than in the case where the distal portion of the free-leg movable link is moved in accordance with the operational goal before occurrence of abnormal contact), while ensuring the stability of the robot 1.

Figure 5C:
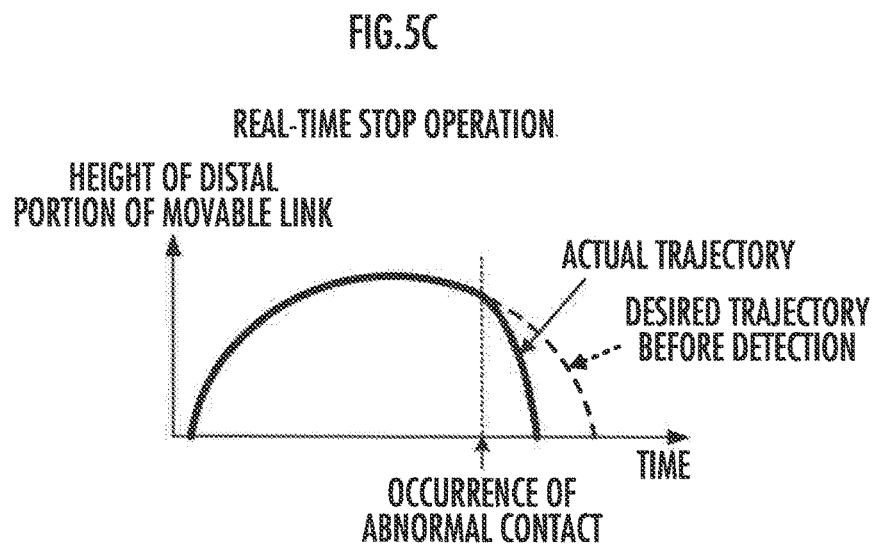

In this "real-time stop operation", after the detection of occurrence of the abnormal contact, the trajectories of desired position and desired posture of the distal portion of the target free-leg movable link (for example, leg link 3) are generated so as to cause the distal portion to move as illustrated in the graph in FIG. 5C, for example. Then, the respective joints of the target free-leg movable link are driven via the corresponding joint actuators 32 to cause the distal portion of the free-leg movable link to move following the trajectories.

Supplementally, during the operation of the robot 1 prior to detection of occurrence of abnormal contact, virtual trajectories for causing a distal portion of each free-leg movable link to be landed in the real-time stop operation pattern can be generated sequentially on the assumption that occurrence of abnormal contact is detected at the current time point. Then, when the occurrence of abnormal contact is actually detected, the joints of the target free-leg movable link can be driven to cause the distal portion of the free-leg movable link to be landed in accordance with the trajectories for the real-time stop operation generated most recently.

Returning to FIG. 4, in the present embodiment, in the case where the operation pattern of the robot 1 at the time of detection of occurrence of abnormal contact is "quadrupedal movement" in which the robot 1 travels at a relatively high speed in the trot mode, the stop control executing section 45 adopts "real-time stop operation", for example, as the stop operation pattern.

Here, in the "quadrupedal movement" in the trot mode, the four movable links 3R, 3L, 4R, and 4L take turns to move in the air as a free-leg movable link. Thus, the movable link to be subjected to "real-time stop operation" is one movable link 3R or 3L or 4R or 4L (in the state of being moved in the air) that was serving as the free-leg movable link at the time of detection of occurrence of the abnormal contact.

It should be noted that in the present embodiment, the abnormal contact detecting section 43 sequentially detects the presence or absence of occurrence of abnormal contact even during the execution of "real-time stop operation". When occurrence of abnormal contact is newly detected during the execution of "real-time stop operation", the stop control executing section 45 changes the stop operation pattern from "real-time stop operation" to "landing free leg on the spot". In this case, the movable link to be subjected to "landing free leg on the spot" is the same as the one subjected to "real-time stop operation".

Further, in the case where the operation pattern of the robot 1 at the time of detection of occurrence of abnormal contact is "quadrupedal movement" in which the robot 1 travels at a relatively low speed in the trot mode or "quadrupedal movement" in which the robot 1 travels in the crawl mode, the stop control executing section 45 adopts "landing free leg on the spot", for example, as the stop operation pattern.

In this case, in the "quadrupedal movement" in the trot mode at low speed, the movable link to be subjected to "landing free leg on the spot" is the same as the one in the case of the above-described "quadrupedal movement" in the trot mode at high speed (i.e. one movable link 3R or 3L or 4R or 4L that was serving as the free-leg movable link).

In the "quadrupedal movement" in the crawl mode, of the four movable links 3R, 3L, 4R, and 4L, two pairs of movable links in the diagonal directions (a pair of movable links 3L, 4R and a pair of movable links 3R, 4L) operate as the free-leg movable links alternately. Thus, in the "quadrupedal movement" in the crawl mode, the movable links to be subjected to "landing free leg on the spot" are the two movable links (3L and 4R, or 3R and 4L) that were serving as the free-leg movable links.

In the case where the operation pattern of the robot 1 at the time of detection of occurrence of abnormal contact is "bipedal movement (without touching with hands)" or "bipedal movement+touching wall with hands" or "bipedal movement+opening/closing door" or "ascending/descending stairs with handrail", then the stop control executing section 45 adopts "real-time stop operation", for example, as the stop operation pattern.

In this case, in any of the above-described operation patterns, the movable link to be subjected to "real-time stop operation" is one movable link 3R or 3L that was serving as a free-leg movable link among the leg links 3R and 3L.

When occurrence of abnormal contact is detected during the execution of "real-time stop operation", the stop operation pattern is changed from "real-time stop operation" to "landing free leg on the spot", as in the case of the high-speed "quadrupedal movement" in the trot mode described above.

Further, in the case where the operation pattern of the robot 1 at the time of detection of occurrence of abnormal contact is "reaching ladder" or "ascending/descending ladder", the stop control executing section 45 adopts "locking joints", for example, as the stop operation pattern.

In this case, the movable links to be subjected to "locking joints" are all the movable links 3R, 3L, 4R, and 4L.

Here, the correspondence between the present invention and the present embodiment will be described supplementally. In the present embodiment, the above-described reference parameters for each type of operation pattern of the mobile robot 1 are common in the processing of the abnormal contact detecting section 43 and the processing of the contact site identifying section 44. So, those reference parameters correspond to the reference parameters for use in detecting contact (the contact detecting reference parameters) and also to the reference parameters for use in identifying a contact site (the contact site identifying reference parameters) in the present invention.

Further, in the present embodiment, for each type of operation pattern of the robot 1, a combination of the contact detecting model Ai and the processing of calculating the error integral values corresponds to the contact detecting model in the present invention. Similarly, for each type of operation pattern of the robot 1, a combination of the contact site identifying model Bi and the processing of calculating the error integral values corresponds to the contact site identifying model in the present invention.

Further, the deviation between the normalized observed value and the normalized desired value of each reference parameter corresponds to the amount of deviation in the present invention.

Further, the operation of moving a movable link in the stop operation pattern corresponds to the response operation in the present invention.

An overall action control during an operation of the robot 1 will now be described with reference to the flowcharts in FIGS. 6 and 7.

Figure 6:
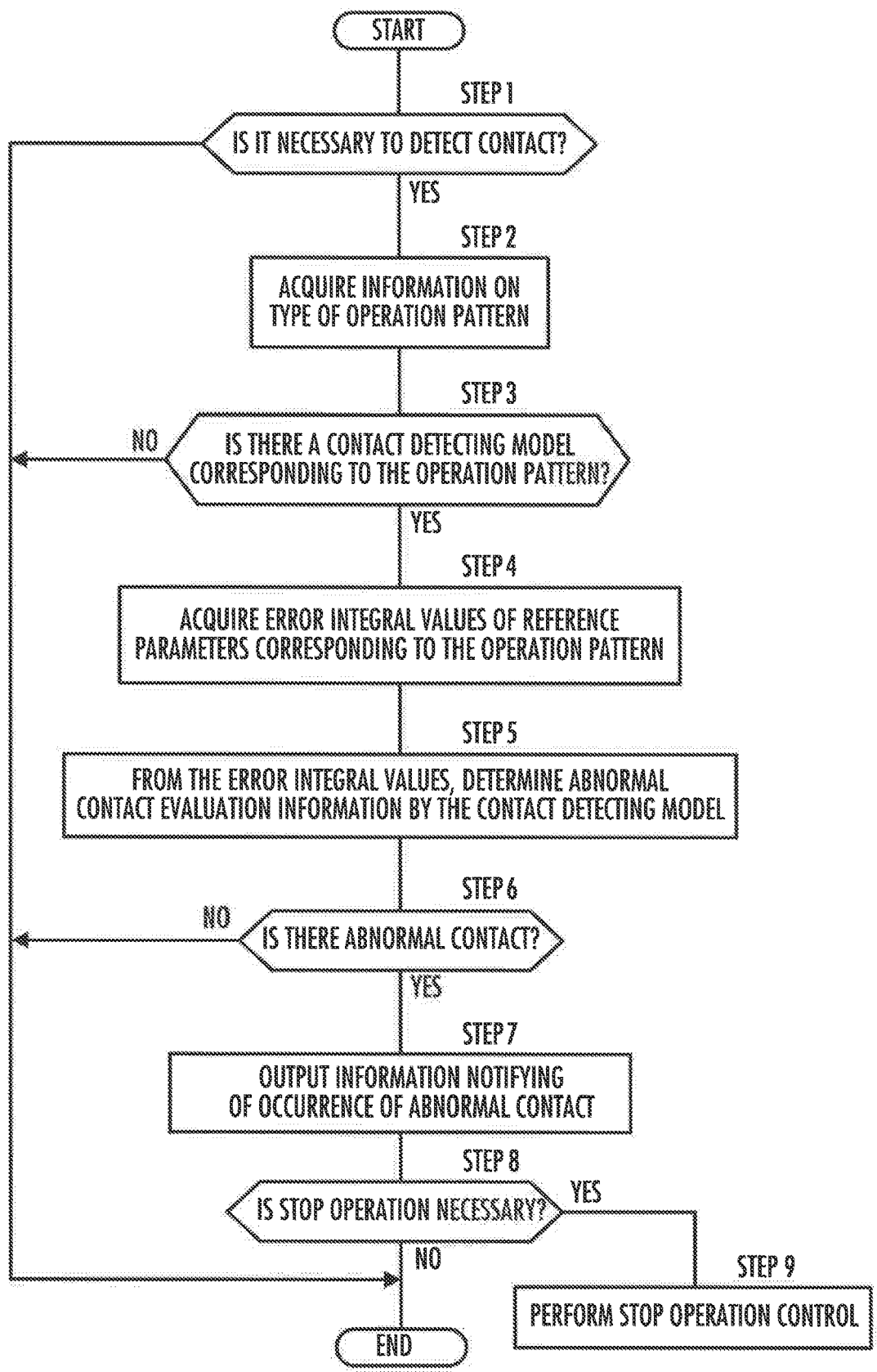
FIG. 6 is a flowchart illustrating the processing performed by a control device during an operation of the mobile robot in the embodiment.

During the operation of the robot 1 (or, in the state where an operational goal is being generated by the operational goal generating section 41 and the drive control of the joints of the robot 1 is being carried out by the joint controlling section 42 in accordance with the operational goal), the control device 30 sequentially performs the processing shown in the flowchart in FIG. 6 at prescribed control processing cycles.

In STEP 1, the control device 30 judges whether there is a need to perform processing of detecting the presence or absence of occurrence of abnormal contact (or, processing of the abnormal contact detecting section 43).

In the present embodiment, an operator of an external server or controlling device is able to instruct the control device 30 about the necessity of the processing of the abnormal contact detecting section 43 as appropriate, and the judgment in STEP 1 is made on the basis of the instruction. It should be noted that the control device 30 may be configured such that it can perform the process of judging the necessity of the processing of the abnormal contact detecting section 43 on the basis of sensed data about the external conditions of the robot 1, for example.

If the judgment result in STEP 1 is negative, the processing in FIG. 6 in the control processing cycle is terminated. On the other hand, if the judgment result in STEP 1 is positive, next in STEP 2, the control device 30 acquires information indicating the type of operation pattern of the robot 1 in the current control processing cycle. The information indicating the type of the operation pattern is provided from the external server or controlling device, for example. Alternatively, the information indicating the type of the operation pattern is determined by the control device 30 on the basis of an operation command provided from the external server or controlling device, or of an operation schedule taught in advance.

Next, in STEP 3, the control device 30 judges whether a contact detecting model Ai corresponding to the type of the current operation pattern of the robot 1 exists (or, has already been created).

In this judgment process, more specifically, the control device 30 for example judges whether an appropriate contact detecting model Ai (corresponding to the current operation pattern of the robot 1) has already been stored in its own storage section. If not, the control device 30 further checks, through communication with an external server, whether the appropriate contact detecting model Ai is stored in the external server.

In this case, the judgment result in STEP 3 becomes negative if the appropriate contact detecting model Ai is not stored in the storage section of the control device 30 or in the external server. In this case, the processing in FIG. 6 in the control processing cycle is terminated.

If the appropriate contact detecting model Ai is stored in either the storage section of the control device 30 or the external server, the judgment result in STEP 3 becomes positive. In this case, next in STEPS 4 and 5, the control device 30 performs the processing in the abnormal contact detecting section 43 described above.

It should be noted that in the case where the appropriate contact detecting model Ai is not stored in the storage section of the control device 30, the appropriate contact detecting model Ai is downloaded from the external server to the storage section of the control device 30 prior to execution of the processing in the abnormal contact detecting section 43.

In STEP 4, the abnormal contact detecting section 43 acquires the error integral values of the respective reference parameters corresponding to the appropriate operation pattern (reference parameters of the prescribed types determined for each type of operation pattern, as shown in FIG. 3). In this case, in the present embodiment, as explained above, the abnormal contact detecting section 43 sequentially acquires the observed value and the desired value of each reference parameter, and sequentially calculates (at each control processing cycle) the error integral value of each reference parameter.

In the following STEP 5, the abnormal contact detecting section 43 determines the abnormal contact evaluation information, from the set of the error integral values of the respective reference parameters corresponding to the appropriate operation pattern, by the contact detecting model Ai corresponding to the appropriate operation pattern.

Next, in STEP 6, the control device 30 checks whether the abnormal contact evaluation information is indicating occurrence of abnormal contact or not, to thereby judge whether abnormal contact has occurred.

If the judgment result in this STEP 6 is negative (when no abnormal contact has occurred), the processing in FIG. 6 in the control processing cycle is terminated.

On the other hand, if the judgment result in STEP 6 is positive (when the occurrence of abnormal contact is detected), in STEP 7, the control device 30 outputs information notifying of the occurrence of abnormal contact to an external server or controlling device. In response thereto, the operator of the external server or controlling device can recognize that abnormal contact has occurred in the robot 1. This allows the operator to take a certain measure such as checking the state of the robot 1 or changing the subsequent tasks of the robot 1.

It should be noted that the notification of the occurrence of abnormal contact may be provided via a lamp or a sound generator included in the robot 1.

Next, in STEP 8, the control device 30 judges whether a stop operation of the robot 1 is necessary.

This judgment is made on the basis of, for example, a command provided from an external server or controlling device, or a predetermined rule, or a result of assessment of the stability of the robot 1 based on the degree of divergence of the actual operating state from the operational goal of the robot 1 or the like.

If the judgment result in STEP 8 is negative, the processing in FIG. 6 in the control processing cycle is terminated.

On the other hand, if the judgment result in STEP 8 is positive, next in STEP 9, the control device 30 performs the processing of controlling the stop operation of the robot 1 by the stop control executing section 45.

In this processing of controlling the stop operation, the stop control executing section 45 selects a stop operation pattern of the robot 1, according to a predetermined rule as illustrated in FIG. 4, in accordance with the type of the operation pattern of the robot 1 at the time of detection of occurrence of abnormal contact (at the time of control processing cycle in which the judgment result in STEP 6 has become positive). That is, the stop control executing section 45 selects one of the stop operation patterns of "locking joints", "landing free leg on the spot", and "real-time stop operation", in accordance with the type of the operation pattern of the robot 1 at the time of detection of occurrence of the abnormal contact.

Then, for the target movable link defined as explained above in accordance with the type of the operation pattern of the robot 1 at the time of detection of occurrence of the abnormal contact, the stop control executing section 45 controls the joints of the target movable link, via the joint actuators 32, to cause the link to perform the stop operation in the selected pattern.

It should be noted that in the case where "real-time stop operation" is selected as the stop operation pattern, the processing of the abnormal contact detecting section 43 is performed continuously, as explained above. In this case, when occurrence of abnormal contact is detected again during the execution of "real-time stop operation", the stop control executing section 45 causes the target movable link to perform the stop operation of "landing free leg on the spot".

Further, when occurrence of abnormal contact is detected in the processing in FIG. 6 (when the judgment result in STEP 6 becomes positive), the control device 30 further performs the processing shown in the flowchart in FIG. 7. It should be noted that the processing shown in the flowchart in FIG. 7 may be performed also in the case where occurrence of abnormal contact is detected during the execution of "real-time stop operation", for example.

In the processing in FIG. 7, first in STEP 11, the control device 30 judges whether there is a need to identify an abnormal contact site. This judgment is made on the basis of a command provided to the control device 30 from the operator of the server or controlling device, as in STEP 1 in FIG. 6 explained above.

If the judgment result in STEP 11 is negative, the processing in FIG. 7 is terminated. On the other hand, if the judgment result in STEP 11 is positive, next in STEP 12, information indicating the type of operation pattern of the robot 1 at the time of detection of occurrence of the abnormal contact is acquired.

Further, in STEP 13, the control device 30 judges whether a contact site identifying model Bi corresponding to the operation pattern at the time of detection of occurrence of the abnormal contact exists (or, has already been created).

This judgment process is performed similarly as in STEP 3 in FIG. 6 explained above. That is, the control device 30 judges whether an appropriate contact site identifying model Bi (corresponding to the operation pattern at the time of detection of occurrence of the abnormal contact) has already been stored in its own storage section. If not, the control device 30 further checks, through communication with an external server, whether the appropriate contact site identifying model Bi is stored in the external server.

In this case, the judgment result in STEP 13 becomes negative if the appropriate contact site identifying model Bi is not stored in the storage section of the control device 30 or in the external server. In this case, the processing in FIG. 7 is terminated.

If the appropriate contact site identifying model Bi is stored in either the storage section of the control device 30 or the external server, the judgment result in STEP 13 becomes positive. In this case, next in STEPS 14 and 15, the control device 30 performs the processing in the contact site identifying section 44 explained above.

It should be noted that in the case where the appropriate contact site identifying model Bi is not stored in the storage section of the control device 30, the appropriate contact site identifying model Bi is downloaded from the external server to the storage section of the control device 30 prior to execution of the processing in the contact site identifying section 44.

In STEP 14, the contact site identifying section 44 acquires the error integral values of the respective reference parameters corresponding to the operation pattern at the time of detection of occurrence of abnormal contact (reference parameters of the prescribed types determined for each type of operation pattern, as shown in FIG. 3). In this case, in the present embodiment, the contact site identifying section 44 acquires the error integral values calculated by the abnormal contact detecting section 43 at the time of detection of occurrence of the abnormal contact.

In the following STEP 15, the contact site identifying section 44 identifies the abnormal contact site (determines the contact movable link identification information and the contact position identification information) from the set of the error integral values of the respective reference parameters corresponding to the operation pattern at the time of detection of occurrence of the abnormal contact, by the contact site identifying model Bi corresponding to that operation pattern.

Then, in STEP 16, the control device 30 outputs to the external server or controlling device the information (contact movable link identification information and contact position identification information) notifying of the result of identification of the abnormal contact site. In response thereto, the operator of the external server or controlling device can recognize which movable link of the robot 1 the abnormal contact source movable link is, from the contact movable link identification information, and also recognize in which position of the abnormal contact source movable link the abnormal contact has occurred, from the contact position identification information. It is thus possible for the operator or other administrator of the robot 1 to take an appropriate measure such as checking the state of the abnormal contact site of the robot 1, repairing, or the like.

It should be noted that the contact movable link identification information and the contact position identification information may be stored in the storage section of the control device 30, so that an administrator of the robot 1 or the like can refer to the information later when necessary.

According to the present embodiment described above, the contact reaction force of each movable link 3, 4, detected by a force detector 31 mounted on each movable link 3, 4 of a robot 1 for operation control of the robot 1, and the contact reaction force function value (in the present embodiment, ZMP change rate) as a function value of the contact reaction force are used as reference parameters (parameters to be referenced) for detecting presence or absence of occurrence of abnormal contact and for identifying an abnormal contact site. Therefore, during an operation of the robot 1 in various operation patterns, presence or absence of occurrence of abnormal contact can be detected and the abnormal contact site can be identified appropriately in real time using the existing force detectors 31, without the need to provide the robot 1 with new sensors for detecting the presence or absence of occurrence of abnormal contact or for identifying the abnormal contact site.

Further, the types of parameters for use as the reference parameters are selected in advance for each of the plurality of types of operation patterns of the robot 1. Accordingly, during the operation in each type of operation pattern, the presence or absence of occurrence of abnormal contact can be detected and the abnormal contact site can be identified with high reliability.

Furthermore, the error integral values described above are used for detecting the presence or absence of occurrence of abnormal contact and for identifying the abnormal contact site. This can enhance the reliability of both of the result of detection of presence or absence of occurrence of abnormal contact and the result of identification of the abnormal contact site.

Further, when occurrence of abnormal contact is detected, the stop operation is performed on the target movable link, with the above-described stop operation pattern in accordance with the type of the operation pattern of the robot 1. This prevents the robot 1 from losing balance due to the occurrence of the abnormal contact as soon as possible, and hence, prevents an increase of damage to the robot 1.

It should be noted that the present invention is not limited to the embodiment described above. Several modifications will be described below.

In the above embodiment, as the reference parameters (the contact detecting reference parameters and the contact site identifying reference parameters), the coordinate axis components of the contact reaction force (translational force vector and moment vector) observed in the global coordinate system were used. Alternatively, for some type of the operation pattern of the robot 1, coordinate axis components of the contact reaction force observed in a coordinate system other than the global coordinate system (for example, a sensor coordinate system of each force detector 31), or components in prescribed directions not limited to the coordinate axis directions, can be used as the contact detecting reference parameters or the contact site identifying reference parameters.

Further, in the above embodiment, the ZMP change rate was adopted as the contact reaction force function value that can be used as the reference parameter (contact detecting reference parameter and contact site identifying reference parameter). However, another type of parameter can be used as the contact reaction force function value. For example, the position of the ZMP can be used as the contact reaction force function value. Alternatively, components about the X axis and about the Y axis of external force moment acting on the entire robot 1 about the desired ZMP (moment generated about the desired ZMP due to the resultant force of the contact reaction forces of all the supporting-leg movable links 3, 4) can be used as the contact reaction force function values.

Further, for example, a linear combination value of prescribed components of the contact reaction forces of certain movable links 3, 4 can be used as the contact reaction force function value.

In the above embodiment, a description was made, by way of example, about the case where, for each type of operation pattern of the robot 1, the types of reference parameters (contact detecting reference parameters) used for detecting the presence or absence of occurrence of abnormal contact and the types of reference parameters contact site identifying reference parameters) used for identifying the abnormal contact site are the same.

However, the types of the contact detecting reference parameters and the types of the contact site identifying reference parameters corresponding to a certain type of operation pattern of the robot 1 may be different from each other. For example, the types of the contact site identifying reference parameters corresponding to a certain type of operation pattern may be greater or smaller in number than the types of the contact detecting reference parameters.

Further, in the above embodiment, the above-described error integral values were used in the processing of the abnormal contact detecting section 43 and of the contact site identifying section 44. However, in the processing in both of the abnormal contact detecting section 43 and the contact site identifying section 44, instead of the error integral values, mean values for each prescribed time span of the deviations between the normalized observed values and the normalized desired values of the respective reference parameters, for example, may be used.

Furthermore, the time span for calculating the error integral values or the mean values can be differentiated in accordance with the type of the operation pattern of the robot 1.

Furthermore, for some type of operation pattern of the robot 1, in the processing in both of the abnormal contact detecting section 43 and the contact site identifying section 44, an integral value or a mean value of the deviation between the observed value and the desired value of each reference parameter, for example, can be used instead of the integral value or the mean value of the deviation between the normalized observed value and the normalized desired value of each reference parameter.

Further, for some type of operation pattern of the robot 1, in the processing in both of the abnormal contact detecting section 43 and the contact site identifying section 44, the presence or absence of occurrence of abnormal contact can be detected or the abnormal contact site can be identified from the observed values (or the normalized observed values) of the reference parameters, for example, without using the desired values of the reference parameters.

Further, part or all of the processing performed by the control device 30 described above can be performed by a computer external to the robot 1.

Further, the mobile robot to which the present invention is applicable is not limited to the robot 1 (humanoid robot) having the configuration described above. For example, the mobile robot may be a robot having three or more leg links, a robot having no arm link, or a robot having three or more arm links.

What is claimed is:

1. An abnormal contact detecting method of detecting presence or absence of occurrence of abnormal contact in a mobile robot, the mobile robot including a body, a plurality of movable links each extended from the body so as to be movable with respect to the body, and a force detector disposed on each movable link so as to be able to detect a contact reaction force acting on the movable link in accordance with contact of a distal portion of the movable link with an external object, the mobile robot being movable with a motion including an operation in which at least one of the movable links is moved in the air and a succeeding operation in which the distal portion of the movable link is brought into contact with an external object, the method comprising:
   a first step of, during an operation of the mobile robot, acquiring, based on outputs from the force detectors, an observed value of respective ones of a plurality of contact detecting reference parameters, the contact detecting reference parameters including at least one of a contact reaction force of a respective one of one or more of the movable links and a contact reaction force function value expressed as a function value of a contact reaction force of a respective one of one or more of the movable links; and
   a second step of using the observed value of the respective ones of the contact detecting reference parameters to detect the presence or absence of occurrence of the abnormal contact by a contact detecting model created in advance.

2. The abnormal contact detecting method for the mobile robot according to claim 1, wherein the contact detecting model is a model created using a one-class support vector machine (SVM) from sample data of the observed value of the respective ones of the contact detecting reference parameters collected during an operation of the mobile robot in a state of absence of occurrence of the abnormal contact.

3. The abnormal contact detecting method for the mobile robot according to claim 1, wherein the contact detecting model is created for each of a plurality of types of operation patterns of the mobile robot, and the contact detecting model used in the second step is a contact detecting model corresponding to the type of the operation pattern of the mobile robot during the operation.

4. The abnormal contact detecting method for the mobile robot according to claim 3, wherein the contact detecting model is configured to detect the presence or absence of occurrence of the abnormal contact by using observed values of respective ones of the contact detecting reference parameters of types predetermined for each of the plurality of types of operation patterns of the mobile robot.

5. The abnormal contact detecting method for the mobile robot according claim 1, wherein the contact detecting model is configured to detect the presence or absence of occurrence of the abnormal contact from an integral value, obtained by integrating, for a period of a prescribed time span, an amount of deviation of an observed value of a respective one of the contact detecting reference parameters from a desired value of the corresponding one of the reference parameters defined by an operational goal of the mobile robot, or from a mean value, obtained by averaging the amount of deviation for a period of a prescribed time span.

6. The abnormal contact detecting method for the mobile robot according to claim 1, further comprising a third step of, when occurrence of the abnormal contact is detected in the second step, identifying an abnormal contact site as a site of the mobile robot where the abnormal contact has occurred, wherein in the third step, an observed value of respective ones of a plurality of contact site identifying reference parameters are acquired based on outputs from the force detectors, the contact site identifying reference parameters including at least one of a contact reaction force of a respective one of one or more of the movable links and said contact reaction force function value, and the observed value of the respective ones of the contact site identifying reference parameters is used to identify the abnormal contact site by a contact site identifying model created in advance.

7. The abnormal contact detecting method for the mobile robot according to claim 6, wherein the contact site identifying model is a model created using a multi-class support vector machine (SVM) from sample data of the observed value of the respective ones of the contact site identifying reference parameters collected during an operation of the mobile robot in a state of presence of occurrence of the abnormal contact.

8. The abnormal contact detecting method for the mobile robot according to claim 6, wherein the contact site identifying model is created for each of a plurality of types of operation patterns of the mobile robot, and the contact site identifying model used in the third step is a model corresponding to the type of the operation pattern of the mobile robot during the operation.

9. The abnormal contact detecting method for the mobile robot according to claim 8, wherein the contact site identifying model is configured to identify the abnormal contact site by using observed values of the contact site identifying reference parameters of types predetermined for each of the plurality of types of operation patterns of the mobile robot.

10. The abnormal contact detecting method for the mobile robot according to claim 6, wherein the contact site identifying model is configured to identify the abnormal contact site from an integral value, obtained by integrating, for a period of a prescribed time span, an amount of deviation of an observed value of a respective one of the contact site identifying reference parameters from a desired value of the corresponding one of the reference parameters defined by an operational goal of the mobile robot, or from a mean value, obtained by averaging the amount of deviation for a period of a prescribed time span.

11. The abnormal contact detecting method for the mobile robot according to claim 1, further comprising a fourth step of, when occurrence of the abnormal contact is detected in the second step, causing the mobile robot to perform a response operation according to the detection, wherein the response operation includes an operation of stopping motion of a movable link of the mobile robot in a state of being moved in the air, in a pattern determined in accordance with the type of the operation pattern of the mobile robot at the time of detection of occurrence of the abnormal contact.

12. The abnormal contact detecting method for the mobile robot according to claim 11, wherein the response operation includes, as the operation of stopping the motion of the movable link in the state of being moved in the air, an operation of stopping the motion of the movable link after causing a distal portion of the movable link to be landed on an external object earlier than in an operational goal of the mobile robot prior to occurrence of the abnormal contact, and the method further comprises:

a fifth step of detecting presence or absence of occurrence of the abnormal contact while the distal portion of the movable link in the state of being moved in the air is moved according to the response operation; and a sixth step of, when occurrence of the abnormal contact is detected in the fifth step, causing the distal portion of the movable link in the state of being moved in the air to be lowered straight down for landing from a position at the time of detection of occurrence of the abnormal contact.

13. A contact site identifying method for a mobile robot, the mobile robot including a body, a plurality of movable links each extended from the body so as to be movable with respect to the body, and a force detector disposed on each movable link so as to be able to detect a contact reaction force acting on the movable link in accordance with contact of a distal portion of the movable link with an external object, the mobile robot being movable with a motion including an operation in which at least one of the movable links is moved in the air and a succeeding operation in which the distal portion of the movable link is brought into contact with an external object, the method comprising:

an A step of detecting presence or absence of occurrence of abnormal contact in the mobile robot during an operation of the mobile robot; and a B step of, when occurrence of the abnormal contact is detected in the A step, identifying an abnormal contact site as a site of the mobile robot where the abnormal contact has occurred, wherein in the B step, an observed value of respective ones of a plurality of contact site identifying reference parameters are acquired based on outputs from the force detectors, the contact site identifying reference parameters including at least one of a contact reaction force of a respective one of one or more of the movable links and a contact reaction force function value expressed as a function value of a contact reaction force of a respective one of one or more of the movable links, and the observed value of the respective ones of the contact site identifying reference parameters is used to identify the abnormal contact site by a contact site identifying model created in advance.

14. The contact site identifying method for the mobile robot according to claim 13, wherein the contact site identifying model is a model created using a multi-class support vector machine (SVM) from sample data of observed values of the respective ones of the contact site identifying reference parameters collected during an operation of the mobile robot in a state of presence of occurrence of the abnormal contact.

15. The contact site identifying method for the mobile robot according to claim 13, wherein the contact site identifying model is created for each of a plurality of types of operation patterns of the mobile robot, and the contact site identifying model used in the B step is a model corresponding to the type of the operation pattern of the mobile robot during the operation.

16. The contact site identifying method for the mobile robot according to claim 15, wherein the contact site identifying model is configured to identify the abnormal contact site by using observed values of the contact site identifying reference parameters of types predetermined for each of the plurality of types of operation patterns of the mobile robot.

17. The contact site identifying method for the mobile robot according to claim 13, wherein the contact site identifying model is configured to identify the abnormal contact site from an integral value, obtained by integrating, for a period of a prescribed time span, an amount of deviation of an observed value of a respective one of the contact site identifying reference parameters from a desired value of the corresponding one of the reference parameters defined by an operational goal of the mobile robot, or from a mean value, obtained by averaging the amount of deviation for a period of a prescribed time span.

18. The contact site identifying method for the mobile robot according to claim 13, further comprising a C step of, when occurrence of the abnormal contact is detected in the A step, causing the mobile robot to perform a response operation according to the detection, wherein
the response operation includes an operation of stopping motion of a movable link of the mobile robot in a state of being moved in the air, in a pattern determined in accordance with the type of the operation pattern of the mobile robot at the time of detection of occurrence of the abnormal contact.

19. The contact site identifying method for the mobile robot according to claim 18, wherein the response operation includes, as the operation of stopping the motion of the movable link in the state of being moved in the air, an operation of stopping the motion of the movable link after causing a distal portion of the movable link to be landed on an external object earlier than in an operational goal of the mobile robot prior to occurrence of the abnormal contact, and the method further comprises:
 a D step of detecting presence or absence of occurrence of the abnormal contact while the distal portion of the movable link in the state of being moved in the air is moved according to the response operation; and
 an E step of, when occurrence of the abnormal contact is detected in the D step, causing the distal portion of the movable link in the state of being moved in the air to be lowered straight down for landing from a position at the time of detection of occurrence of the abnormal contact.

* * * * *